(12) United States Patent
Itaba

(10) Patent No.: US 11,601,841 B2
(45) Date of Patent: Mar. 7, 2023

(54) RADIO STATION, RADIO COMMUNICATION METHOD, NON-TRANSITORY COMPUTER READABLE MEDIUM, AND RADIO COMMUNICATION SYSTEM

(71) Applicant: NEC Corporation, Tokyo (JP)

(72) Inventor: Naoto Itaba, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/263,745

(22) PCT Filed: Jul. 18, 2019

(86) PCT No.: PCT/JP2019/028281
§ 371 (c)(1),
(2) Date: Jan. 27, 2021

(87) PCT Pub. No.: WO2020/026835
PCT Pub. Date: Feb. 6, 2020

(65) Prior Publication Data
US 2021/0377779 A1 Dec. 2, 2021

(30) Foreign Application Priority Data
Aug. 1, 2018 (JP) .............................. JP2018-145151

(51) Int. Cl.
*H04W 28/02* (2009.01)
*H04W 76/15* (2018.01)
*H04W 28/10* (2009.01)

(52) U.S. Cl.
CPC ....... *H04W 28/0252* (2013.01); *H04W 28/10* (2013.01); *H04W 76/15* (2018.02)

(58) Field of Classification Search
CPC .. H04W 28/0252; H04W 28/10; H04W 76/15
See application file for complete search history.

(56) References Cited

U.S. PATENT DOCUMENTS 8,514,756 B1 * 8/2013 Ramachandra ....... H04W 76/40
370/310
9,743,448 B2 * 8/2017 Futaki .................... H04B 7/024
(Continued)

FOREIGN PATENT DOCUMENTS

JP 2013-038759 A 2/2013
JP 2018-500838 A 1/2018
(Continued)

OTHER PUBLICATIONS

International Search Report for PCT Application No. PCT/JP2019/028281, dated Aug. 27, 2019.
(Continued)

*Primary Examiner* — Parth Patel
(74) *Attorney, Agent, or Firm* — Sughrue Mion, PLLC

(57) ABSTRACT

The present disclosure provides a radio station and a radio communication method capable of performing efficient control in Dual Connectivity. A radio station (10) includes: a classification unit (11) that classifies, when a data radio bearer is established with a communication terminal through a radio station (20), the data radio bearer into one of a plurality of groups based on a predetermined classification condition; and a transmission unit (12) that transmits, to the radio station (20), an establishment request message requesting establishment of the data radio bearer, and the group into which the data radio bearer is classified.

10 Claims, 12 Drawing Sheets

(56) References Cited

U.S. PATENT DOCUMENTS

| | | | |
|---|---|---|---|
| 10,375,606 B2* | 8/2019 | Futaki | H04W 36/0016 |
| 10,440,630 B2* | 10/2019 | Aminaka | H04W 36/04 |
| 10,609,753 B2* | 3/2020 | Wu | H04W 36/14 |
| 10,791,497 B2* | 9/2020 | Kim | H04W 76/27 |
| 11,184,942 B2* | 11/2021 | Pelletier | H04W 52/365 |
| 2013/0040645 A1* | 2/2013 | Nishida | H04W 36/0022 455/436 |
| 2014/0119192 A1* | 5/2014 | Koshimizu | H04W 28/0231 370/236 |
| 2015/0094073 A1* | 4/2015 | Peng | H04W 72/0406 455/450 |
| 2015/0244429 A1* | 8/2015 | Zhang | H04B 7/024 370/329 |
| 2015/0334551 A1* | 11/2015 | Aminaka | H04W 76/15 370/252 |
| 2015/0365993 A1* | 12/2015 | Aminaka | H04W 76/15 370/329 |
| 2018/0035436 A1* | 2/2018 | Sharma | H04W 72/085 |
| 2018/0124612 A1* | 5/2018 | Babaei | H04W 72/042 |
| 2018/0132294 A1* | 5/2018 | Xing | H04W 76/10 |
| 2018/0199245 A1* | 7/2018 | Futaki | H04W 16/32 |
| 2018/0332639 A1* | 11/2018 | Futaki | H04W 76/15 |
| 2018/0376444 A1* | 12/2018 | Kim | H04W 74/0833 |
| 2019/0149993 A1* | 5/2019 | Tenny | H04W 12/10 370/329 |
| 2019/0191474 A1* | 6/2019 | Jin | H04W 76/15 |
| 2019/0215899 A1* | 7/2019 | Ma | H04L 5/0098 |
| 2019/0268824 A1* | 8/2019 | Kubota | H04W 76/27 |
| 2019/0357075 A1* | 11/2019 | Van Der Velde | H04W 76/15 |
| 2019/0394685 A1* | 12/2019 | Sharma | H04W 88/085 |
| 2020/0037382 A1* | 1/2020 | Xiao | H04W 36/0066 |
| 2020/0053814 A1* | 2/2020 | Minokuchi | H04W 76/15 |
| 2020/0084655 A1* | 3/2020 | Fiorani | H04W 24/08 |
| 2020/0163140 A1* | 5/2020 | Mochizuki | H04W 72/042 |
| 2020/0275498 A1* | 8/2020 | Fiorani | H04W 76/11 |
| 2020/0296626 A1* | 9/2020 | Deng | H04W 72/04 |
| 2020/0337098 A1* | 10/2020 | Shi | H04W 76/20 |
| 2020/0351963 A1* | 11/2020 | Shuai | H04W 76/12 |
| 2020/0389810 A1* | 12/2020 | Wang | H04W 28/0815 |
| 2021/0076351 A1* | 3/2021 | Gao | H04W 68/005 |
| 2021/0153286 A1* | 5/2021 | Park | H04W 28/24 |
| 2021/0235534 A1* | 7/2021 | Fiorani | H04W 76/19 |
| 2021/0345440 A1* | 11/2021 | Fiorani | H04W 52/0222 |
| 2021/0377779 A1* | 12/2021 | Itaba | H04W 72/04 |

FOREIGN PATENT DOCUMENTS

| | | |
|---|---|---|
| WO | 2018/031081 A1 | 2/2018 |
| WO | 2019/117109 A1 | 6/2019 |

OTHER PUBLICATIONS

3GPP TS 38.425 V15.2.0 (Jun. 2018), "3rd Generation Partnership Project; Technical Specification Group Radio Access Network; NG-RAN; NR user plane protocol (Release 15)", pp. 1-21.

LG Electronics Inc., Specific issues on E-RAB management and Bearer Type, 3GPP TSG-RAN WG3#83 R3-140280, section 2.1, Prague, Czech Republic, Feb. 1, 2014.

Huawei, Downlink Flow control for EN-DC, 3GPP TSG RAN WG3 adhoc_R3_AH_NR_1706 R3-172456, section 2, Qingdao, China, Jun. 20, 2017.

* cited by examiner

Fig. 4

| Bits | | | | | | | | Number of Octets |
|---|---|---|---|---|---|---|---|---|
| 7 | 6 | 5 | 4 | 3 | 2 | 1 | 0 | |
| PDU Type (=1) | | | | Highest Transmitted NR PDCP SN Ind | Highest Delivered NR PDCP SN Ind | Final Frame Ind. | Lost Packet Report | 1 |
| Spare | | | | Group Control Ind | Highest Retransmitted NR PDCP SN Ind | Highest Delivered Retransmitted NR PDCP SN Ind | Cause Report | 1 |
| Desired buffer size for the data radio bearer | | | | | | | | 4 |
| Minimum desired buffer size for the UE | | | | | | | | 4 |
| Number of lost NR-U Sequence Number ranges reported | | | | | | | | 0 or 1 |
| Start of lost NR-U Sequence Number range | | | | | | | | 0 or (6* Number of reported lost NR-U SN ranges) |
| End of lost NR-U Sequence Number range | | | | | | | | |
| Highest successfully delivered NR PDCP Sequence Number | | | | | | | | 0 or 3 |
| Highest transmitted NR PDCP Sequence Number | | | | | | | | 0 or 3 |
| Cause Value | | | | | | | | 0 or 1 |
| Highest successfully delivered retransmitted NR PDCP Sequence Number | | | | | | | | 3 |
| Highest retransmitted NR PDCP Sequence Number | | | | | | | | 3 |
| Number of Groups reported | | | | | | | | 0 or 1 |
| Group | | | | | | | | 0 or (1* Number of reported Groups) |
| Control Information | | | | | | | | 0 or 1 |
| Padding | | | | | | | | 0-3 |

RADIO STATION, RADIO COMMUNICATION METHOD, NON-TRANSITORY COMPUTER READABLE MEDIUM, AND RADIO COMMUNICATION SYSTEM

This application is a National Stage Entry of PCT/JP2019/028281 filed on Jul. 18, 2019, which claims priority from Japanese Patent Application 2018-145151 filed on Aug. 1, 2018, the contents of all of which are incorporated herein by reference, in their entirety.

TECHNICAL FIELD

The present disclosure relates to a radio station, a radio communication method, a non-transitory computer readable medium, and a radio communication system.

BACKGROUND ART

The 3rd Generation Partnership Project (3GPP) defines Dual Connectivity in which packet data is transmitted and received between one communication terminal (UE: User Equipment) and two base stations. For Dual Connectivity, a Split Bearer is defined for using communication bands operated by a plurality of base stations as one data bearer.

The aforementioned two base stations are referred to as a Master eNodeB (MeNB) and a Secondary eNodeB (SeNB). Cells of the MeNB are referred to as a Master Cell Group (MCG) and cells of the SeNB are referred to as a Secondary Cell Group (SCG). Further, for the Dual Connectivity, an MCG Split bearer configuration and an SCG Split bearer configuration are defined as Split bearer configurations. The MCG Split bearer configuration is a configuration in which the MeNB transmits user data, which is Downlink (DL) data received from a Serving Gateway (S-GW) that is a host apparatus, to the UE via both the MeNB and the SeNB. The SCG Split bearer configuration is a configuration in which the SeNB transmits user data received from the S-GW to the UE via both the SeNB and the MeNB.

In the Split bearer configuration, for example, it is necessary for the MeNB to determine the appropriate amount of data to be distributed in the communication band under control of the MeNB and the communication band under control of the SeNB. When the data exceeding the communication band under the control of the SeNB is transmitted to the SeNB, data is discarded in the SeNB due to a buffer overflow, and data transfer efficiency is thus reduced. Therefore, it is necessary for the MeNB to recognize a communication status of the SeNB and determine the appropriate amount of data to be transmitted to the SeNB, and as a technique for the MeNB to recognize a communication status of the SeNB, Flow Control is known (Patent Literature 1 and Non-patent Literature 1).

CITATION LIST

Patent Literature

Patent Literature 1: Published Japanese Translation of PCT International Publication for Patent Application, No. 2018-500838

Non Patent Literature

Non-patent Literature 1: 3GPP TS 38.425 V15.2.0 (2018-06), "3rd Generation Partnership Project; Technical Specification Group Radio Access Network; NG-RAN; NR user plane protocol (Release 15)"

SUMMARY OF INVENTION

Technical Problem

It should be noted that the Flow Control disclosed in Non-Patent Literature 1 and the like is performed for each Data Radio Bearer (DRB) which is a bearer of user data communication. Therefore, in the Flow Control operation disclosed in Non-Patent Literature 1 and the like, even when the same control is performed with regard to a plurality of DRBs, it is necessary to exchange Flow Control signals for the number of DRBs. In this case, consumption of the communication band and the amount of control loads on the MeNB and the SeNB increase in proportion to the number of DRBs. That is, the control efficiency is not high in the Dual Connectivity defined in Non-Patent Literature 1 because control can be performed only per user.

Incidentally, in order to improve control efficiency, a network slicing technique, in which a network is virtually divided (sliced), is known. In the network slicing technique, a network is virtually divided in accordance with requirements such as low latency and high reliability, and DRBs that match the requirements are set to the respective divided networks. Thus, by applying the network slicing technique to the Dual Connectivity, control is performed per virtual network, and it is expected that the control efficiency will be improved. However, as described above, the Flow Control is performed per DRB, and thus the network slicing technique cannot be applied.

An object of the present disclosure is to solve the above-described problem, and to provide a radio station, a radio communication method, a non-transitory computer readable medium, and a radio communication system that are capable of performing efficient control in Dual Connectivity.

Solution to Problem

A radio station according to the present disclosure includes:
a classification unit configured to classify, when a data radio bearer is established with a communication terminal through another radio station, the data radio bearer into one of a plurality of groups based on a predetermined classification condition; and
a transmission unit configured to transmit, to the other radio station, an establishment request message requesting establishment of the data radio bearer, and the group into which the data radio bearer is classified.

A radio station according to the present disclosure includes a reception unit configured to receive, when a data radio bearer is established between a communication terminal and another radio station through the radio station, an establishment request message requesting establishment of the data radio bearer, and one of a plurality of groups into which the other radio station has classified the data radio bearer based on a predetermined classification condition, from the other radio station.

A radio communication method according to the present disclosure includes:
classifying, when a data radio bearer is established with a communication terminal through another radio station, the data radio bearer into one of a plurality of groups based on a predetermined classification condition; and transmitting, to the other radio station, an establishment request message requesting establishment of the data radio bearer, and the group into which the data radio bearer is classified.

Advantageous Effects of Invention

According to the present disclosure, it is possible to provide a radio station, a radio communication method, a non-transitory computer readable medium, and a radio communication system that are capable of performing efficient control in Dual Connectivity.

BRIEF DESCRIPTION OF DRAWINGS

FIG. 4 is a diagram showing a configuration example of a DDDS message format according to the second example embodiment;

DESCRIPTION OF EMBODIMENTS

Hereinafter, example embodiments of the present disclosure will be described with reference to the drawings. Note that in order to clarify the explanation, the following descriptions and the drawings are partially omitted and simplified as appropriate. Further, the same symbols are assigned to the same elements throughout the drawings, and redundant descriptions are omitted as necessary.

First Example Embodiment

Figure 1:
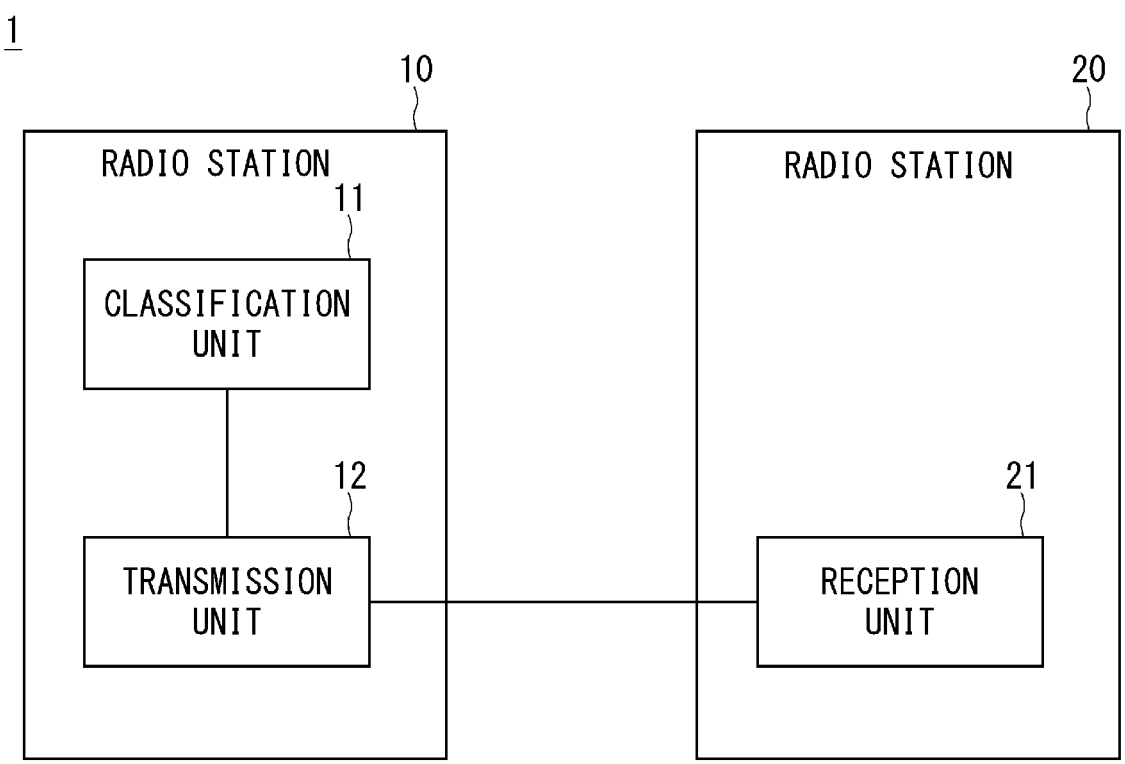
FIG. 1 is a diagram showing a configuration example of a radio communication system according to a first example embodiment.

A radio communication system 1 according to a first example embodiment is described with reference to FIG. 1. FIG. 1 is a diagram showing a configuration example of the radio communication system according to the first example embodiment. The radio communication system 1 includes a radio station 10 and a radio station 20. The radio communication system 1 provides Dual Connectivity to a communication terminal (not shown).

The radio station 10 may be, for example, a base station, a relay station (RN: Relay Node), or an access point. Alternatively, the radio station 10 may be an NR NodeB (NR NB) or a gNodeB (gNB). Alternatively, the radio station 10 may be an eNodeB (evolved Node B or eNB). Alternatively, the radio station 10 may be an aggregation node (CU: Central Unit) in a Centralized Radio Access Network (C-RAN) configuration. The C-RAN configuration is a configuration in which baseband processing functions of small cells are split into a distributed node (DU: Distributed Unit), which is a radio station on the antenna side, and the CU, which is a control apparatus on the core network side, and some of the baseband processing functions of a plurality of small cells are aggregated in the CU.

The radio station 20 may be, for example, a base station, a relay station (RN), or an access point. Alternatively, the radio station 20 may be an NR NodeB (NR NB) or a gNodeB (gNB). Alternatively, the radio station 20 may be an eNodeB (evolved Node B or eNB). Alternatively, the radio station 20 may be the DU in the C-RAN configuration.

When the radio station 10 transmits user data from a host apparatus (not shown) to a communication terminal (not shown), the radio station 10 establishes a data radio bearer with the communication terminal through the radio station 20. The data radio bearer may be referred to as a DRB.

The radio station 10 includes a classification unit 11 and a transmission unit 12.

When a data radio bearer is established with the communication terminal through the radio station 20, the classification unit 11 classifies the data radio bearer into any one of a plurality of groups based on a predetermined classification condition.

The transmission unit 12 transmits, to the radio station 20, an establishment request message requesting establishment of a data radio bearer, and a group into which the data radio bearer is classified by the classification unit 11. The transmission unit 12 may transmit, to the radio station 20, the establishment request message including the group into which the data radio bearer is classified by the classification unit 11.

The radio station 20 includes a reception unit 21.

When the radio station 10 establishes a data radio bearer with the communication terminal through the radio station 20, the reception unit 21 receives, from the radio station 10, an establishment request message requesting establishment of the data radio bearer, and the group into which the data radio bearer is classified by the classification unit 11.

As described above, when the radio station 10 establishes a data radio bearer with the communication terminal through the radio station 20, the radio station 10 classifies the data radio bearer into any one of the groups based on a predetermined classification condition, and transmits the group into which the data radio bearer is classified to the radio station 20. The radio station 20 receives the group into which the data radio bearer is classified by the radio station 10. This configuration enables the radio stations 10 and 20 to mutually manage the groups into which the respective data radio bearers are classified. As a result, the radio stations 10 and 20 can perform control using the group into which the radio station 10 has classified the data radio bearer, instead of performing control per user. Therefore, according to this example embodiment, it is possible to perform efficient control in Dual Connectivity.

Second Example Embodiment

Next, a second example embodiment is described. The second example embodiment is an example embodiment in which the first example embodiment is described in more detail.

<Configuration Example of Radio Communication System>

Figure 2:
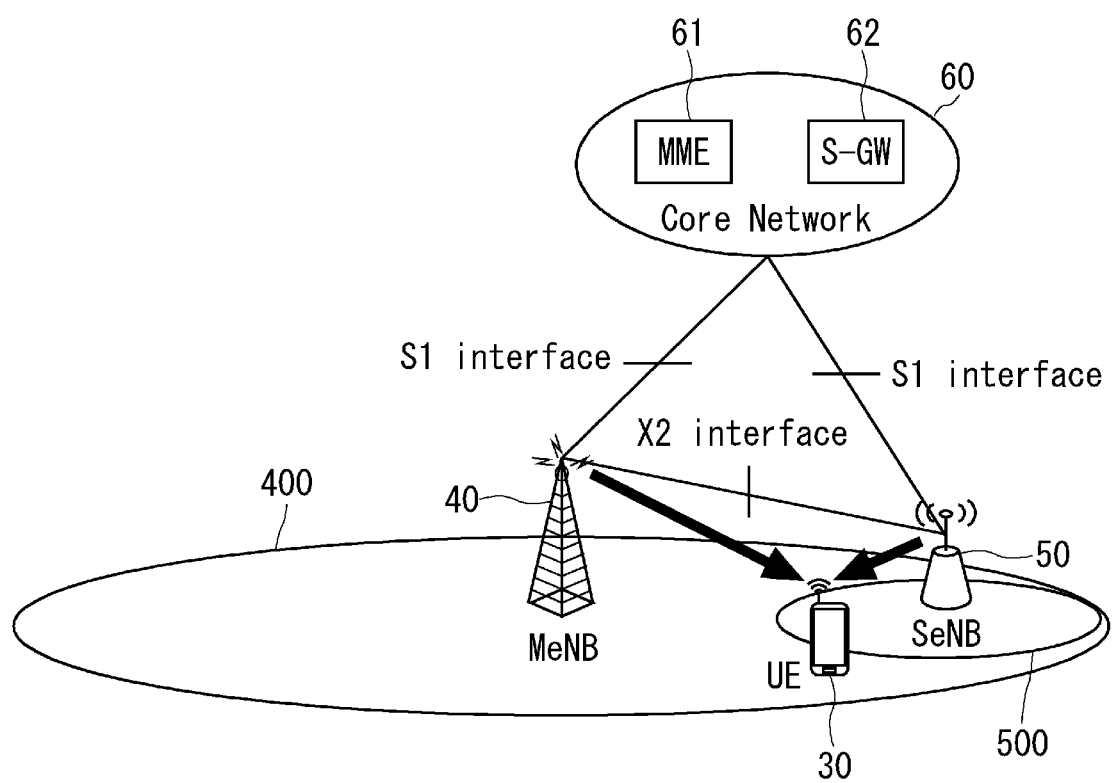
FIG. 2 is a diagram showing a configuration example of a radio communication system according to a second example embodiment.

A radio communication system 100 according to the second example embodiment is described with reference to FIG. 2. FIG. 2 is a diagram showing a configuration example of the radio communication system according to the second example embodiment. As shown in FIG. 2, the radio communication system 100 includes a UE 30, an MeNB 40, an SeNB 50, a Mobility Management Entity (MME) 61, and an S-GW 62. Note that the radio communication system 100 includes only one UE 30, one MeNB 40, one SeNB 50, one MME 61, and one S-GW 62, but may instead include a plurality of each of these components.

The radio communication system 100 provides Dual Connectivity that allows the UE 30 to connect to both the MeNB 40 and the SeNB 50. As described above, the MCG Split bearer configuration and the SCG Split bearer configuration are defined as the Split bearer configurations in the Dual Connectivity. In this example embodiment, a description is given in accordance with the assumption that the Split bearer configuration of the radio communication system 100 is the MCG Split bearer configuration.

The UE 30 is used as a generic name of a communication terminal in the 3GPP. The UE 30 may be, for example, a smartphone terminal, a tablet type terminal, or a mobile phone terminal. Further, the UE 30 may be an Internet of Things (IoT) terminal (an IoT device) or a Machine Type Communication (MTC) terminal. The UE 30 receives user data which is DL data from two base stations (the MeNB 40 and the SeNB 50).

The MeNB 40 corresponds to the radio station 10 according to the first example embodiment. The MeNB 40 may be, for example, an eNB or a gNB. The MeNB 40 is connected to the SeNB 50 through an X2 interface and communicates with the SeNB 50 through the X2 interface. A communication area 400 provided by the MeNB 40 is formed so as to include a communication area 500 provided by the SeNB 50. Further, the MeNB 40 is connected to the MME 61 and the S-GW 62 through an S1 interface and communicates with the MME 61 and the S-GW 62 through the S1 interface.

The MeNB 40 receives a bearer setup request message from the MME 61 and establishes a DRB with the UE 30. The DRB corresponds to a data radio bearer in the first example embodiment. Note that the bearer setup request message may be, for example, an Initial Context setup request message or an E-RAB Setup request message.

When the MeNB 40 establishes the DRB with the UE 30, the MeNB 40 establishes the DRB with the UE 30 without through the SeNB 50 and establishes, as the MCG Split bearer, the DRB with the UE 30 through the SeNB 50.

When the MeNB 40 establishes the DRB with the UE 30 through the SeNB 50, the MeNB 40 classifies this DRB into any one of a plurality of groups based on a predetermined classification condition. The MeNB 40 may classify the DRB into any one of the plurality of groups, for example, based on a priority of the bearer included in the bearer setup request message from the MME 61. That is, the predetermined classification condition may be a condition corresponding to a priority of the DRB to be established, and the priority of the DRB may correspond to the priority of the bearer included in the bearer setup request message. Then, the MeNB 40 transmits, to the SeNB 50, an establishment request message requesting establishment of the DRB, and the group into which the DRB to be established is classified. The MeNB 40 may include the aforementioned group in the establishment request message and transmit it, or may transmit the aforementioned group separately. Note that the following description is given in accordance with the assumption that the aforementioned group is included in the establishment request message. Further, the establishment request message may be a DRB Setup Request message, a SENB ADDITION REQUEST message, or a SENB MODIFICATION REQUEST message. The following description is given in accordance with the assumption that the establishment request message is a DRB Setup Request message.

When user data which is DL data is transmitted from the S-GW 62, the MeNB 40 transmits the user data to the UE 30 by using the DRB established with the UE 30. Specifically, the MeNB 40 transmits the user data to the UE 30 without through the SeNB 50 and transmits the user data to the UE 30 through the SeNB 50.

Further, the MeNB 40 receives a DL DATA DELIVERY STATUS (DDDS) message, which is a message notifying about a DL data communication status in the SeNB 50, from the SeNB 50. The SeNB 50 may transmit the DDDS messages per user (per DRB) or per group. The SeNB 50 does not transmit all the DDDS messages per DRB, but instead transmits some of the DDDS messages per group to which the respective DRBs are assigned, so that the number of transmissions of the DDDS messages can be reduced. Thus, in this example embodiment, it is possible to perform efficient control in Dual Connectivity. Note that since the DDDS message is an example of a message notifying about a DL data communication status, the message notifying about a DL data communication status may be a message having a message name other than a DDDS message. A specific format of the DDDS message will be described later.

When any one of the aforementioned plurality of groups is included in the DDDS message, the MeNB 40 controls the DRB classified into the group included in the DDDS message. The MeNB 40 controls the DRB classified into the group included in the DDDS message based on a control content included in the DDDS message.

The control content may be a control for stopping processing of the DRB classified into the group included in the DDDS message. Alternatively, the control content may be a control for making the communication speed of the DRB classified into the group included in the DDDS message lower than the current communication speed or a control for making the communication speed of the DRB higher than the current communication speed. Alternatively, the control content may be a control for changing the ratio of the amount of data to be transmitted to the UE 30 through another base station to the amount of data to be transmitted to the UE 30 without through the other base station among the amount of data to be transmitted by the DRB classified into the group included in the DDDS message. In this example embodiment, the other base station is the SeNB 50. Further, in this case, the control content may be a control for increasing or decreasing the ratio of the amount of data to be transmitted through the other base station (the SeNB 50) to the amount of data to be transmitted without through the other base station (the SeNB 50).

The SeNB 50 corresponds to the radio station 20 according to the first example embodiment. The SeNB 50 may be, for example, an eNB or a gNB. The SeNB 50 is connected to the MeNB 40 through the X2 interface and communicates with the MeNB 40 through the X2 interface. Further, the SeNB 50 is connected to the MME 61 and the S-GW 62 through the S1 interface and communicates with the MME 61 and the S-GW 62 through the S1 interface.

The SeNB 50 receives a DRB Setup Request message from the MeNB 40, and establishes a DRB between the MeNB 40 and the UE 30 through the SeNB 50. When the SeNB 50 establishes the DRB, it transmits a DRB Setup Response message to the MeNB 40. When the SeNB 50 receives user data from the MeNB 40, the SeNB 50 transmits the received user data to the UE 30.

Further, the SeNB 50 monitors at least one of a state of the SeNB 50 and a radio state between the SeNB 50 and the UE 30. The state of the SeNB 50 may be, for example, a processing load on the SeNB 50 or the remaining amount of a buffer of the SeNB 50. The SeNB 50 monitors at least one of the state of the SeNB 50 and the radio state between the SeNB 50 and the UE 30, and if the SeNB 50 determines that it is necessary to perform control because, for example, the processing load is high, the SeNB 50 determines a group to be controlled and the control content. The SeNB 50 includes the group to be controlled and the control content in a DDDS message and transmits it to the MeNB 40.

The MME 61 is a core network apparatus configuring a Core Network 60, and performs, for example, transmission and reception of Control-plane (C-plane) data and mobility management of the UE 30. The core network apparatus configuring the Core Network 60 may be a network apparatus referred to as an Evolved Packet Core (EPC) in the 3GPP. As described above, the MME 61 transmits the bearer setup request message to the MeNB 40.

The S-GW 62 is a core network apparatus configuring the core network 60, and transmits User-plane (U-plane) data through the MeNB 40 and the SeNB 50 to the UE 30. The S-GW 62 and the MME 61 may configure the EPC.

<Configuration Example of Radio Protocol>

Figure 3:
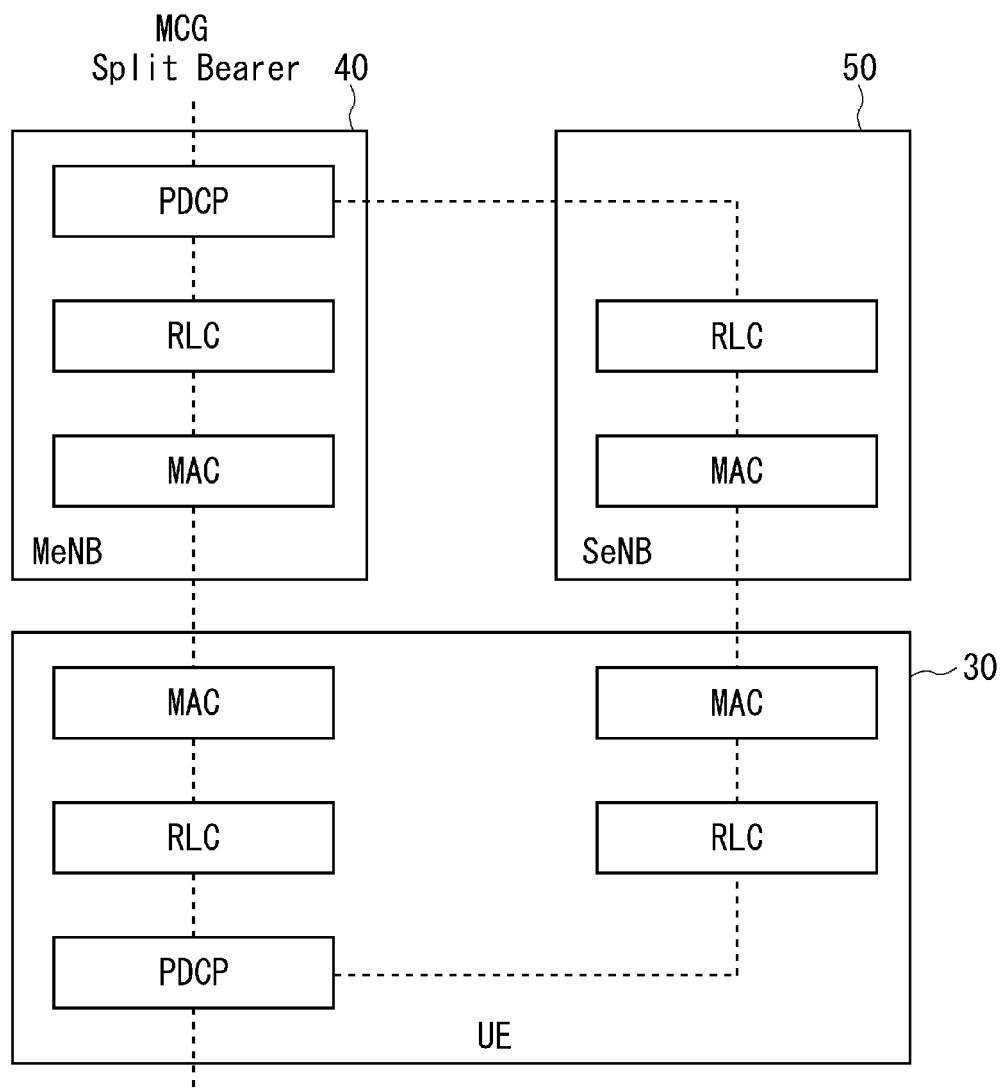
FIG. 3 is a diagram for explaining a configuration example of a radio protocol in the second example embodiment.

Next, a configuration example of a radio protocol in the second example embodiment is described with reference to FIG. 3. FIG. 3 is a diagram for explaining the configuration example of the radio protocol in the second example embodiment.

As shown in FIG. 3, the UE 30 and the MeNB 40 comprise a Packet Data Convergence Protocol (PDCP) layer, a Radio Link Control (RLC) layer, and a Medium Access Control (MAC) layer. The SeNB 50 comprises the RLC layer and the MAC layer. In this example embodiment, a description has been given in accordance with the assumption that the Split bearer configuration is the MCG Split bearer configuration. However, when it is the SCG Split bearer configuration, the PDCP layer is included in the SeNB 50 and is not included in the MeNB 40. That is, while the Split bearer configuration is the MCG Split bearer configuration when the PDCP layer is included in the MeNB 40, it is the SCG Split bearer configuration when the PDCP layer is included in the SeNB 50.

In the case of the MCG Split bearer configuration, U-plane DL data received from the S-GW 62 is received at the PDCP layer in the MeNB 40. Here, the PDCP layer of the MeNB 40 transmits part of DL data (PDCP Protocol Data Unit (PDU)) to the UE 30 via Cells under the control of the MeNB 40, and transmits another part of the DL data (PDCP PDU) to the UE 30 via the SeNB 50. That is, in the case of the MCG Split bearer configuration, the U-plane DL data is split in the PDCP layer of the MeNB 40.

In the case of the MCG Split bearer configuration, in order to sufficiently use the communication band of the SeNB 50 without narrowing the communication band of the SeNB 50, the SeNB 50 feeds back a DDDS message, which is a Flow Control signal, to the MeNB 40. Then, the MeNB 40 refers to the DDDS message and adjusts the amount (i.e., the amount of the PDCP PDU) of data of the DL data to be transmitted to the SeNB 50. Note that in the case of the SCG Split bearer configuration, the DDDS message is transmitted from the MeNB 40 to the SeNB 50.

<Configuration Example of DDDS Message Format>

Next, a configuration example of a DDDS message format according to the second example embodiment is described with reference to FIG. 4. FIG. 4 is a diagram showing the configuration example of the DDDS message format according to the second example embodiment. FIG. 4 is a message format in which information pieces newly defined in this example embodiment are added to the message format defined in the 3GPP TS 36.425.

Hatched information pieces among the information pieces shown in FIG. 4 are information pieces newly defined in this example embodiment. Specifically, in this example embodiment, Group Control Ind, Number of Groups reported, Group, and Control Information are newly defined as DDDS message formats. Note that since the information pieces other than the above are specified in the 3GPP TS 36.425, detailed descriptions thereof will be omitted.

The Group Control Ind is a parameter indicating whether control is performed per group into which the respective DRBs are classified. When the Group Control Ind is 0 (zero), it indicates "without control", where no control is performed per group. That is, when the Group Control Ind is 0 (zero), it indicates that control is performed per user (per DRB).

Further, when Group Control Ind is 1, it indicates "with control", where control is performed per group. That is, the Group Control Ind of 1 indicates that control is performed per group. Note that in this case, the DDDS message is not transmitted per DRB, but per group.

The Number of Groups reported is a parameter in which the number of groups to be controlled is set when the Group Control Ind is 1 (with control). That is, when the Number of Groups reported is 2 or greater, it indicates that a plurality of groups are controlled by a single DDDS message.

The Group is a parameter in which the number of a group to be controlled is set, and corresponds to a group included in the DDDS message described above. For example, when a plurality of groups are to be controlled, the Group Control Ind is set to 1 and the Number of Groups reported is set to 2 or greater. Note that the same group number as the value set in the Number of Groups reported is set in the Group. Note that the following description is given in accordance with the assumption that information set in the Group is a group number, but any information identifying a group, such as a group Identifier (ID), can be set.

The Control Information is a parameter in which a control content indicating what kind of control is to be performed with regard to the group included in the DDDS message is set. The Control Information corresponds to the above-described control content included in the DDDS message. In the Control Information, a character string indicating the control content may be set, or a control number to which the control content is assigned in advance may be set.

The control content may be a control for stopping processing of the DRB classified into the group included in the DDDS message. Alternatively, the control content may be a control for making the communication speed of the DRB classified into the group included in the DDDS message lower than the current communication speed or a control for making the communication speed of the DRB higher than the current communication speed. Alternatively, the control content may be a control for changing the ratio of the amount of data to be transmitted to the UE 30 through the SeNB 50 to the amount of data to be transmitted to the UE 30 without through the SeNB 50 among the amount of data to be transmitted by the DRB classified into the group included in the DDDS message. Specifically, the control content may be a control for increasing or decreasing the ratio of the amount of data to be transmitted through the SeNB 50 to the amount of data to be transmitted without through the SeNB 50.

As described above, in this example embodiment, by adding new information to the DDDS message format defined in the 3GPP and then defining this new information, it is possible to perform control per group into which the respective DRBs are classified. Further, in this example embodiment, it is possible to perform control per group and to control a plurality of groups.

<Configuration Example of MeNB>

Figure 5:
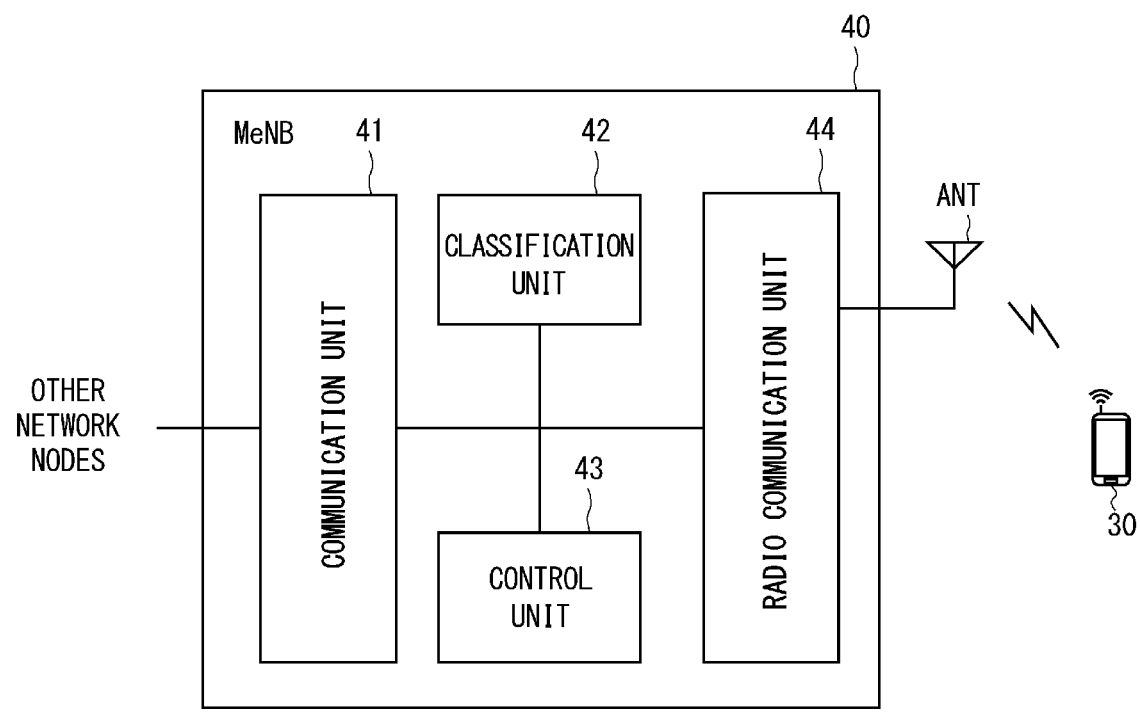
FIG. 5 is a diagram showing a configuration example of an MeNB according to the second example embodiment.

Next, a configuration example of the MeNB 40 according to the second example embodiment is described with reference to FIG. 5. FIG. 5 is a diagram showing the configuration example of the MeNB according to the second example embodiment. The MeNB 40 includes a communication unit 41, a classification unit 42, a control unit 43, a radio communication unit 44, and an ANT (Antenna). Note that in FIG. 4, the MeNB 40 includes one ANT, but may instead include two or more antennas.

The communication unit 41 communicates with other network nodes including the SeNB 50, the MME 61, and the S-GW 62. The communication unit 41 comprises a transmission unit and a reception unit. The communication unit 41 corresponds to the transmission unit 12 according to the first example embodiment, and it further has a function of a reception unit. The communication unit 41 receives a bearer setup request message from the MME 61. The bearer setup request message may be, for example, an Initial Context setup request message or an E-RAB Setup request message.

When the communication unit 41 receives the bearer setup request message from the MME 61, the communication unit 41 transmits a DRB Setup Request message to the SeNB 50, receives a DRB Setup Response message from the SeNB 50, and establishes a DRB. The communication unit 41 transmits the DRB Setup Request message, including the group into which the DRB to be established by the DRB Setup Request message is classified, to the SeNB 50. The group which the communication unit 41 includes in the DRB Setup Request message is the group into which the DRB is classified by the classification unit 42.

The communication unit 41 transmits part of the user data which is the DL data received from the S-GW 62 to the UE 30 through the SeNB 50. Further, the communication unit 41 transmits another part of the user data received from the S-GW 62 to the UE 30 through the radio communication unit 44.

The communication unit 41 receives a DDDS message from the SeNB 50. The DDDS message received by the communication unit 41 is a DDDS message in conformity with the DDDS message format in which new information pieces are added to the DDDS message format defined in the 3GPP described in FIG. 4.

The classification unit 42 corresponds to the classification unit 11 according to the first example embodiment. The classification unit 42 classifies the DRB to be established by the DRB Setup Request message into any one of a plurality of groups based on a predetermined classification condition. The classification unit 42 classifies the DRB to be established by the DRB Setup Request message into any one of the plurality of groups based on the priority of the bearer included in the bearer setup request message received by the communication unit 41 from the MME 61. When the classification unit 42 classifies the DRB to be established by the DRB Setup Request message into any one of the groups, the classification unit 42 transmits, to the communication unit 41, the group into which the DRB is classified. Further, the classification unit 42 stores information about which group the respective DRBs have been classified into. Specifically, the classification unit 42 stores the above information as a management table associating the DRB number for identifying respective DRBs with the number of the group into which each of the respective DRBs is classified.

When any one of the plurality of groups into which the respective DRBs are classified is included in the DDDS message, the control unit 43 controls the DRB classified into the group included in the DDDS message. Specifically, the control unit 43 determines whether the Group Control Ind included in the DDDS message received by the communication unit 41 is 1 (with control). When the Group Control Ind included in the DDDS message is 1 (with control), the control unit 43 determines that control is performed per group. That is, when the Group Control Ind included in the DDDS message is 1 (with control), the control unit 43 determines that any one of the plurality of groups into which the classification unit 42 has classified the respective DRBs is included.

When the Group Control Ind is 1, the control unit 43 refers to the Number of Groups reported, the Group, and the Control Information. Then, the control unit 43 determines the DRB classified into the group set in the Group using the management table stored in the classification unit 42, and controls the determined DRB as indicated by the control content set in the Control Information.

The radio communication unit 44 is a communication unit that communicates with the UE 30. The radio communication unit 44 transmits part of the user data received from the S-GW 62 to the UE 30 through the ANT.

<Configuration Example of SeNB>

Figure 6:
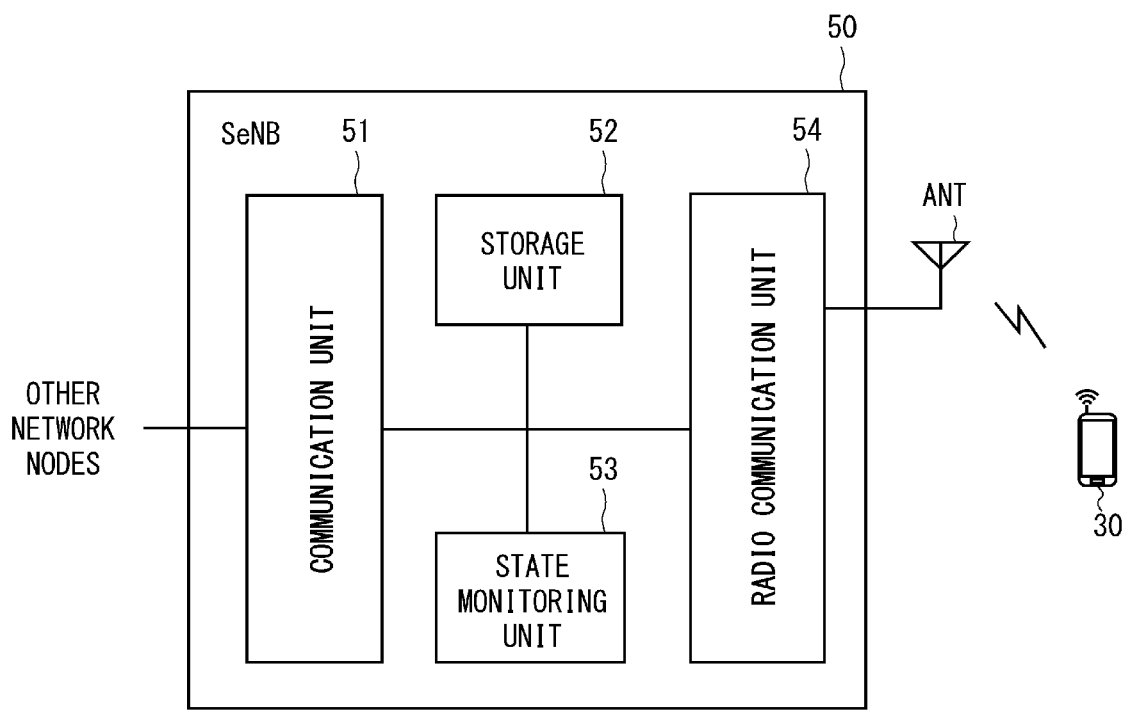
FIG. 6 is a diagram showing a configuration example of an SeNB according to the second example embodiment.

Next, a configuration example of the SeNB 50 according to the second example embodiment is described with reference to FIG. 6. FIG. 6 is a diagram showing a configuration example of the SeNB according to the second example embodiment. The SeNB 50 includes a communication unit 51, a storage unit 52, a state monitoring unit 53, a radio communication unit 54, and the ANT. Note that in FIG. 5, the SeNB 50 includes one ANT, but may instead include two or more antennas.

The communication unit 51 communicates with other network nodes including the MeNB 40, the MME 61 and the S-GW 62. The communication unit 51 comprises a transmission unit and a reception unit. The communication unit 51 corresponds to the reception unit 21 according to the first example embodiment, and it further has a function of a transmission unit.

The communication unit 51 receives a DRB Setup Request message from the MeNB 40 and establishes a DRB with the MeNB 40. The DRB Setup Request message includes the group into which the DRB to be established by this message is classified. The communication unit 51 associates the DRB number included in the DRB Setup Request message with the number of the group into which the DRB is classified, and stores them in the storage unit 52. Further, when the communication unit 51 establishes the DRB, it transmits a DRB Setup Response message to the MeNB 40.

The communication unit 51 receives user data transmitted from the MeNB 40 and transmits the user data to the UE 30 through the radio communication unit 54.

The communication unit 51 transmits a DDDS message to the MeNB 40. The DDDS message transmitted by the communication unit 51 is the DDDS message shown in FIG. 4.

The storage unit 52 associates the DRB number included in the DRB Setup Request message with the number of the group into which the DRB is classified, and stores them in the storage unit 52.

The state monitoring unit 53 monitors at least one of a state of the SeNB 50 and a radio state between the SeNB 50 and the UE 30. The state monitoring unit 53 determines whether any one of the groups assigned to the respective DRBs is to be controlled based on at least one of the state and the radio state of the SeNB 50 to be monitored. When the state monitoring unit 53 determines that any one of the groups assigned to the respective DRBs is to be controlled, the state monitoring unit 53 transmits a DDDS message including the group to be controlled to the MeNB 40 through the communication unit 51.

Specifically, when the state monitoring unit 53 determines that any one of the aforementioned groups is to be controlled, the state monitoring unit 53 determines the group to be controlled and the control content. When the state monitoring unit 53 determines the group to be controlled and the control content, the state monitoring unit 53 sets 1 (with control) in the Group Control Ind of the DDDS message. Further, the state monitoring unit 53 sets the number of groups to be controlled, the group to be controlled, and the control content in the Number of Groups reported, the Group, and the Control Information, respectively. Then, the state monitoring unit 53 transmits the DDDS message to the MeNB 40 through the communication unit 51.

The radio communication unit 54 is a communication unit that communicates with the UE 30. The radio communication unit 54 transmits the user data received from the MeNB 40 to the UE 30 through the ANT.

<Operation Example of Radio Communication System>

Figure 7:
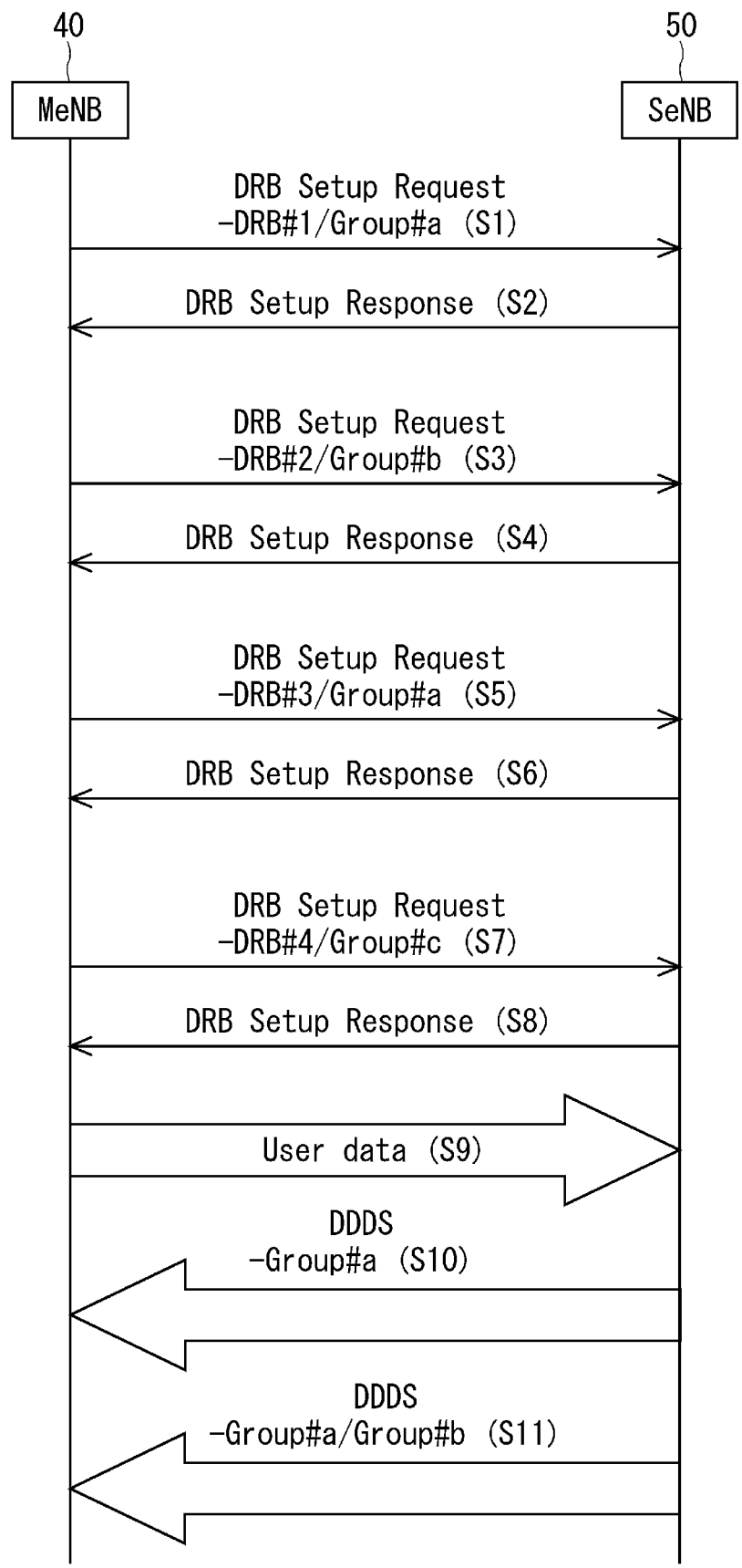
FIG. 7 is a sequence diagram for explaining an operation example of the radio communication system according to the second example embodiment.

Next, a configuration example of the radio communication system 100 according to the second example embodiment is described with reference to FIG. 7. FIG. 7 is a sequence diagram for explaining an operation example of the radio communication system according to the second example embodiment.

Specifically, FIG. 7 is a diagram of a sequence from when the MeNB 40 establishes a DRB with the UE 30 through the SeNB 50 to when the SeNB 50 transmits a DDDS message, and shows that the MeNB 40 establishes four DRBs. Note that as a premise of FIG. 7, a description is given in accordance with the assumption that a plurality of UEs 30 are included. That is, the four DRBs established by the MeNB 40 may be the DRBs of one UE 30 or the DRBs of a plurality of UEs 30 the number of which is from two to four. Further, a description is given in accordance with the assumption that although not shown in FIG. 7, the MeNB 40 has received a bearer setup request message from the MME 61 when the respective DRBs are established.

First, the MeNB 40 transmits a DRB Setup Request message for establishing a DRB #1 to the SeNB 50 (Step S1). It is assumed that the MeNB 40 determines to classify the DRB #1 into a Group #a based on a priority of the bearer included in the bearer setup request message received from the MME 61. Then, the MeNB 40 transmits the DRB Setup Request message, including the number (the DRB #1) of the DRB to be established and the number of the group (the Group #a) into which the DRB is classified, to the SeNB 50.

Next, the SeNB 50 establishes the DRB #1 based on the DRB Setup Request message, and when the DRB #1 is established, the SeNB 50 transmits a DRB Setup Response message to the MeNB 40 (Step S2).

From Step S3 to Step S8, the MeNB 40 and the SeNB 50 perform the same operations as those performed in Steps S1 and S2. It is assumed here that the MeNB 40 classifies a DRB #2 into a Group #b, a DRB #3 into the Group #a, and a DRB #4 into a Group #c. The MeNB 40 transmits a DRB Setup Request message, including the number of the DRB to be established and the number of the group into which this DRB is classified, to the SeNB 50. Then, when the respective DRBs are established, the SeNB 50 transmits a DRB Setup Response message to the MeNB 40.

Next, when the MeNB 40 receives user data which is DL data from the S-GW 62, it transmits part of the user data to the SeNB 50 (Step S9). Although not shown in FIG. 7, the SeNB 50 transmits the user data received from the MeNB 40 to the UE 30.

Next, the SeNB 50 transmits a DDDS message to the MeNB 40 (Step S10). It is assumed that the SeNB 50 determines that it is necessary to control the DRB classified into the Group #a based on at least one of a state of the SeNB 50 and a radio state between the SeNB 50 and the UE 30. Then, the SeNB 50 includes the Group #a in the DDDS message and transmits it to the MeNB 40.

Specifically, the SeNB 50 sets the Group Control Ind of the DDDS message to 1 (with control) and sets the Number of Groups reported of the DDDS message to 1. Further, the SeNB 50 sets the Group #a in the Group of the DDDS message and sets the control content for the Group #a in the Control Information of the DDDS message. Then, the SeNB 50 transmits the DDDS message to the MeNB 40.

Next, the SeNB 50 transmits a DDDS message to the MeNB 40 (Step S11). It is assumed that the SeNB 50 determines that it is necessary to control the DRBs classified into the Groups #a and #b based on at least one of the state of the SeNB 50 and the radio state between the SeNB 50 and the UE 30. Then, the SeNB 50 includes the Groups #a and #b in the DDDS message and transmits it to the MeNB 40.

Specifically, the SeNB 50 sets the Group Control Ind of the DDDS message to 1 (with control) and sets the Number of Groups reported of the DDDS message to 2. Further, the SeNB 50 sets the Groups #a and #b in the Group of the DDDS message and sets the control contents for the Groups #a and #b in the Control Information of the DDDS message. Then, the SeNB 50 transmits the DDDS message to the MeNB 40.

As described above, when the MeNB 40 establishes a DRB with the UE 30 through the SeNB 50, the MeNB 40 classifies the DRB into any one of the groups based on a priority of the bearer included in the bearer setup request message received from the MME 61. The MeNB 40 sets in a DRB Setup Request message the number of the DRB to be established and the number of the group into which this DRB is classified, and transmits it to the SeNB 50. The SeNB 50 establishes the DRB based on the DRB Setup Request message, and associates the number of the DRB with the number of the group into which the DRB is classified and stores them. This configuration enables the MeNB 40 and the SeNB 50 to mutually manage the groups into which the respective DRBs are classified. Thus, the MeNB 40 and the SeNB 50 can perform control per group as well as performing control per DRB. Therefore, according to this example embodiment, it is possible to perform efficient control in Dual Connectivity.

Further, according to this example embodiment, it is possible to reduce the processing loads on the base stations (the MeNB 40 and the SeNB 50). As described above, in this example embodiment, as the SeNB 50 can transmit a DDDS messages per group, it is not necessary to generate DDDS messages for each DRB and transmit them to the MeNB 40 as in the case of related art. That is, it is possible to reduce the number of DDDS messages as compared with the case of related art. Thus, it is possible to reduce the processing load on the SeNB 50. Further, in the MeNB 40, it is possible to reduce the number of DDDS messages to be received, whereby it is possible to control a plurality of DRBs collectively. Thus, it is possible to reduce the processing load on the MeNB 40. Therefore, according to this example embodiment, it is possible to reduce the processing loads on the base stations (the MeNB 40 and the SeNB 50).

Further, as described above, it is possible to reduce the number of DDDS messages as compared with the case of related art. That is, it is possible to reduce the number of packets transmitted to a transmission path connecting the MeNB 40 to the SeNB 50. Therefore, according to this example embodiment, it is possible to reduce the consumption of a band of the transmission path.

MODIFIED EXAMPLE

In the second example embodiment described above, a description has been given in accordance with the assumption that the Split bearer configuration is the MCG split bearer configuration, but the Split bearer configuration may instead be the SCG Split bearer configuration. In the case of the SCG split bearer configuration, the SeNB has the configuration of the MeNB 40 according to the second example embodiment, and the SeNB performs the operation example performed by the MeNB 40 in the second example embodiment. Further, the MeNB has the configuration of the SeNB 50 according to the second example embodiment, and the MeNB performs the operation example performed by the SeNB 50 in the second example embodiment. By doing the above, it is possible to obtain effects similar to those in the second example embodiment.

Third Example Embodiment

Next, a third example embodiment is described. In the third example embodiment, the configuration of the SeNB differs from that of the second example embodiment, because the SeNB has a C-RAN configuration and comprises a CU and a DU. The configurations other than the above are basically the same as those of the second example embodiment, and thus descriptions of configurations similar to those of the second example embodiment will be omitted as appropriate.

<Configuration Example of Radio Communication System>

Figure 8:
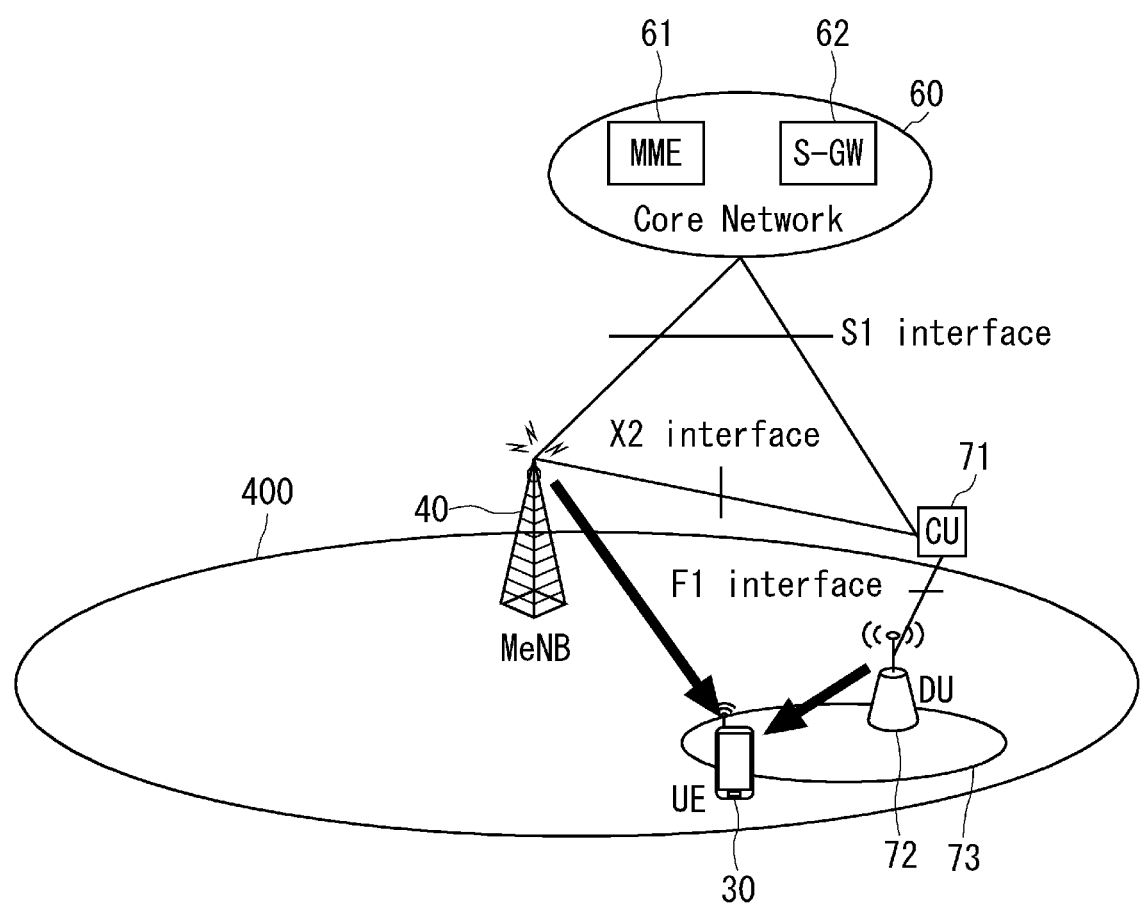
FIG. 8 is a diagram showing a configuration example of a radio communication system according to a third example embodiment.

A radio communication system 200 according to the third example embodiment is described with reference to FIG. 8. As shown in FIG. 8, the radio communication system 200 includes the UE 30, the MeNB 40, the MME 61, the S-GW 62, a CU 71, and a DU 72. That is, the radio communication system 200 has a configuration in which the SeNB 50 of the radio communication system 100 according to the second example embodiment is replaced with the CU 71 and the DU 72. Note that the radio communication system 200 includes one UE 30, one MeNB 40, one MME 61, one S-GW 62, one CU 71, and one DU 72, but may instead include a plurality of each of these components. Further, the communication area 400 provided by the MeNB 40 is formed so as to include a communication area 73 provided by the DU 72.

The radio communication system 200 provides Dual Connectivity that allows the UE 30 to connect to both the MeNB 40 and the DU 72. A description is given in accordance with the assumption that the Split bearer configuration of the radio communication system 200 according to the third example embodiment is the MCG Split bearer configuration.

The UE 30 corresponds to the UE 30 according to the second example embodiment. In the third example embodiment, the UE 30 receives user data which is DL data from two base stations (the MeNB 40 and the DU 72).

The MeNB 40 corresponds to the radio station 10 according to the first example embodiment, and corresponds to the MeNB 40 according to the second example embodiment. The MeNB 40 according to this example embodiment is basically similar to the MeNB 40 according to the second example embodiment, and thus redundant descriptions thereof will be omitted. The MeNB 40 is connected to the CU 71 through an X2 interface and communicates with the CU 71 through the X2 interface.

The MeNB 40 receives a bearer setup request message from the MME 61 and establishes a DRB with the UE 30. When the MeNB 40 establishes the DRB with the UE 30, the MeNB 40 establishes the DRB with the UE 30 without through the CU 71 and the DU 72 and establishes, as the MCG Split bearer, the DRB with the UE 30 through the CU 71 and the DU 72.

When the MeNB 40 establishes the DRB with the UE 30 through the CU 71 and the DU 72, the MeNB 40 classifies this DRB into any one of a plurality of groups based on a predetermined classification condition. The MeNB 40 classifies the DRB to be established by a DRB Setup Request message into any one of the plurality of groups based on the priority of the bearer included in the bearer setup request message received from the MME 61. Then, the MeNB 40 transmits the DRB Setup Request message, which is an establishment request message requesting establishment of the DRB, and the group into which the DRB to be established is classified, to the DU 72 through the CU 71.

When user data is transmitted from the S-GW 62, the MeNB 40 transmits the user data to the UE 30 without through the CU 71 and the DU 72 and transmits the user data to the UE 30 through the CU 71 and the DU 72.

Further, the MeNB 40 receives a DDDS message, which is a message notifying about a DL data communication status in the DU 72, through the CU 71 from the DU 72. The DU 72 may transmit the DDDS messages per user (per DRB) or per group. When any one of the aforementioned plurality of groups is included in the DDDS message, the MeNB 40 controls the DRB classified into the group included in the DDDS message.

The CU 71 is an aggregation node in the C-RAN configuration. As described above, the C-RAN configuration is a configuration in which baseband processing functions of small cells are split into the distributed node (DU), which is a radio station on the antenna side, and the CU, which is a control apparatus on the core network side, and some of the baseband processing functions of a plurality of small cells are aggregated in the CU.

The CU 71 is connected to the MeNB 40 through the X2 interface and communicates with the MeNB 40 through the X2 interface. Further, the CU 71 is connected to the MME 61 and the S-GW 62 through the S1 interface, and communicates with the MME 61 and the S-GW 62 through the S1 interface. Further, the CU 71 is connected to the DU 72 through an F1 interface, and communicates with the DU 72 through the F1 interface.

When the Split bearer configuration is the MCG Split bearer configuration, the CU 71 is a communication apparatus which mainly performs relay between the MeNB 40 and the DU 72. When the CU 71 receives the DRB Setup Request message from the MeNB 40, it transmits the DRB Setup Request message received from the MeNB 40 to the DU 72. That is, the CU 71 transmits, to the DU 72, the DRB Setup Request message and the group into which the DRB to be established by the MeNB 40 is classified. When the CU 71 receives the user data from the MeNB 40, it transmits the received user data to the UE 30 through the DU 72.

The DU 72 corresponds to the radio station 20 according to the first example embodiment, and corresponds to the SeNB 50 according to the second example embodiment. The DU 72 is a distributed node in the C-RAN configuration. The DU 72 is connected to the CU 71 through the F1 interface, and communicates with the CU 71 through the F1 interface. When the DU 72 receives the DRB Setup Request message from the MeNB 40 through the CU 71, it establishes the DRB between the MeNB 40 and the UE 30 through the CU 71 and the DU 72. When the DU 72 establishes the DRB between the MeNB 40 and the UE 30 through the CU 71 and the DU 72, it transmits a DRB Setup Response message to the MeNB 40 through the CU 71. When the DU 72 receives the user data from the MeNB 40 through the CU 71, it transmits the received user data to the UE 30.

Further, the DU 72 monitors at least one of a state of the DU 72 and a radio state between the DU 72 and the UE 30. As the state of the DU 72, the DU 72 may monitor, for example, the processing load on the DU 72 or the remaining amount of a buffer of the DU 72. The DU 72 monitors at least one of the state of the DU 72 and the radio state between the DU 72 and the UE 30, and if the DU 72 determines that it is necessary to perform control because, for example, the processing load is high, the DU 72 determines a group to be controlled and the control content. The DU 72 includes the group to be controlled and the control content in a DDDS message and transmits it to the MeNB 40. Note that a specific format of the DDDS message is similar to the format shown in FIG. 4, and thus descriptions thereof will be omitted. The configurations of the MME 61 and the S-GW 62 are similar to those of the second example embodiment, and thus descriptions thereof will be omitted.

<Configuration Example of Radio Protocol>

Figure 9:
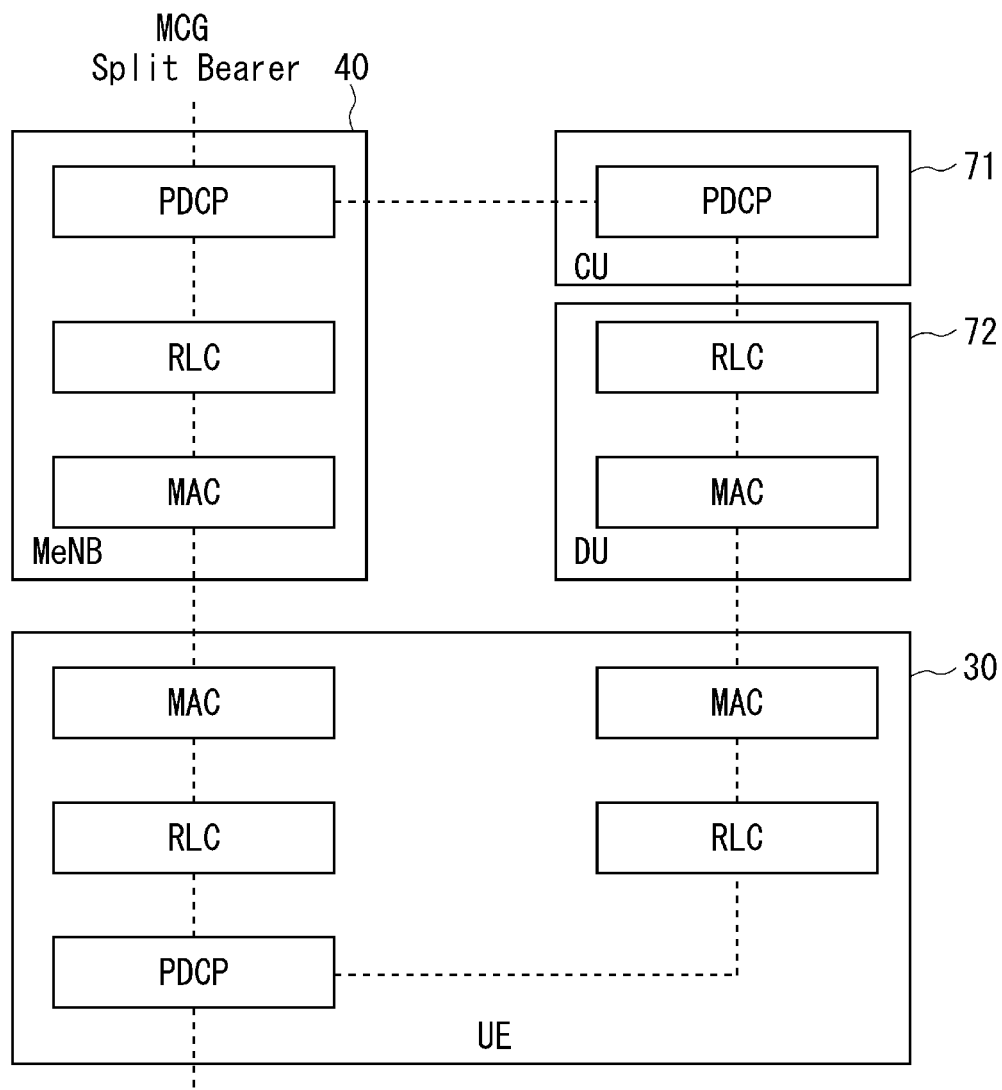
FIG. 9 is a diagram for explaining a configuration example of a radio protocol in the third example embodiment.

Next, a configuration example of a radio protocol in the third example embodiment is described with reference to FIG. 9. FIG. 9 is a diagram for explaining the configuration example of the radio protocol in the third example embodiment.

As shown in FIG. 9, the UE 30 and the MeNB 40 comprise the PDCP layer, the RLC layer, and the MAC layer. The CU 71 comprises the PDCP layer. The DU 72 comprises the RLC layer and the MAC layer.

In the case of the MCG Split bearer configuration, U-plane DL data received from the S-GW 62 is received by the PDCP layer in the MeNB 40. The PDCP layer of the MeNB 40 transmits part of DL data (PDCP PDU) to the UE 30 via the Cells under the control of the MeNB 40, and transmits another part of the DL data (PDCP PDU) to the UE 30 via the CU 71 and the DU 72. Further, a DDDS message is transmitted from the DU 72 to the CU 71 through the F1 interface, and is transmitted from the CU 71 to the MeNB 40.

In the case of the SCG Split bearer configuration, the U-plane DL data received from the S-GW 62 is received by the PDCP layer in the CU 71. The PDCP layer of the CU 71 transmits, through the DU 72, part of DL data (PDCP PDU) to the UE 30 via the Cells under the control of the CU 71, and transmits another part of the DL data (PDCP PDU) to the UE 30 via the MeNB 40. Further, a DDDS message is transmitted from the DU 72 to the CU 71 through the F1 interface and is transmitted from the MeNB 40 to the CU 71.

<Configuration Example of MeNB>

Next, a configuration example of the MeNB 40 is described. A basic configuration of the MeNB 40 according to the third example embodiment is similar to that according to the second example embodiment, and thus a description is given with reference to FIG. 5. Further, descriptions of configurations of the MeNB 40 according to the third example embodiment similar to those of the MeNB 40 according to the second example embodiment will be omitted as appropriate. Like in the case of the second example embodiment, the MeNB 40 according to the third example embodiment includes the communication unit 41, the classification unit 42, the control unit 43, the radio communication unit 44, and the ANT (Antenna).

The communication unit 41 communicates with other network nodes including the CU 71, the MME 61, and the S-GW 62. The communication unit 41 transmits a DRB Setup Request message to the DU 72 through the CU 71. The communication unit 41 transmits the DRB Setup Request message, including the group into which the DRB to be established by the DRB Setup Request message is classified, to the DU 72 through the CU 71. Note that the aforementioned group is the group into which the classification unit 42 has classified the DRB.

The communication unit 41 receives a DRB Setup Response message from the DU 72 through the CU 71.

The communication unit 41 transmits part of user data which is DL data received from the S-GW 62 to the UE 30 through the CU 71 and the DU 72.

The communication unit 41 receives a DDDS message from the DU 72 through the CU 71. The DDDS message received by the communication unit 41 is a DDDS message in conformity with the DDDS message format in which new information pieces are added to the DDDS message format defined in the 3GPP described in FIG. 4.

The classification unit 42, the control unit 43, and the radio communication unit 44 are similar to those according to the second example embodiment, and thus descriptions thereof will be omitted.

<Configuration Example of CU>

Figure 10:
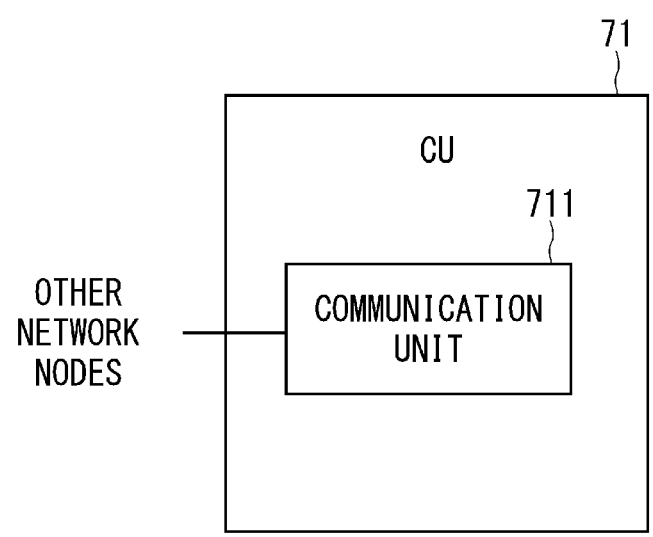
FIG. 10 is a diagram showing a configuration example of a CU according to the third example embodiment.

Next, a configuration example of the CU 71 according to the third example embodiment is described with reference to FIG. 10. FIG. 10 is a diagram showing the configuration example of the CU according to the third example embodiment. As shown in FIG. 3, the CU 71 includes a communication unit 711. The communication unit 711 communicates with other network nodes including the MeNB 40, the DU 72, the MME 61, and the S-GW 62. The communication unit 711 comprises a transmission unit and a reception unit.

The communication unit 711 receives a DRB Setup Request message from the MeNB 40. The DRB Setup Request message includes a group into which a DRB to be established is classified by the MeNB 40. The communication unit 711 transmits the DRB Setup Request message received from the MeNB 40 to the DU 72. The communication unit 711 receives a DRB Setup response message from the DU 72 and transmits it to the MeNB 40.

<Configuration Example of DU>

Next, a configuration example of the DU 72 is described. A basic configuration of the DU 72 is similar to that of the SeNB 50 according to the second example embodiment, and thus a description is given with reference to FIG. 6. Further, descriptions of configurations of the DU 72 similar to those of the SeNB 50 according to the second example embodiment will be omitted as appropriate. The DU 72 includes the communication unit 51, the storage unit 52, the state monitoring unit 53, the radio communication unit 54, and the ANT. Note that the DU 72 may include two or more antennas.

The communication unit 51 communicates with other network nodes including the MeNB 40, the MME 61, the S-GW 62, and the CU 71.

The communication unit 51 receives a DRB Setup Request message from the MeNB 40 through the CU 71. The DRB Setup Request message includes the group into which the DRB to be established by this message is classified. The communication unit 51 associates the DRB number included in the DRB Setup Request message with the number of the group into which the DRB is classified, and stores them in the storage unit 52. When the communication unit 51 establishes the DRB, it transmits a DRB Setup Response message to the MeNB 40 through the CU 71.

The communication unit 51 receives user data transmitted from the MeNB 40 and transmits the user data to the UE 30 through the radio communication unit 54.

The communication unit 51 transmits a DDDS message to the MeNB 40. The DDDS message transmitted by the communication unit 51 is the DDDS message shown in FIG. 4.

The storage unit 52, the state monitoring unit 53, and the radio communication unit 54 are similar to those of the SeNB 50 according to the second example embodiment, and thus descriptions thereof will be omitted.

<Operation Example of Radio Communication System>

Figure 11:
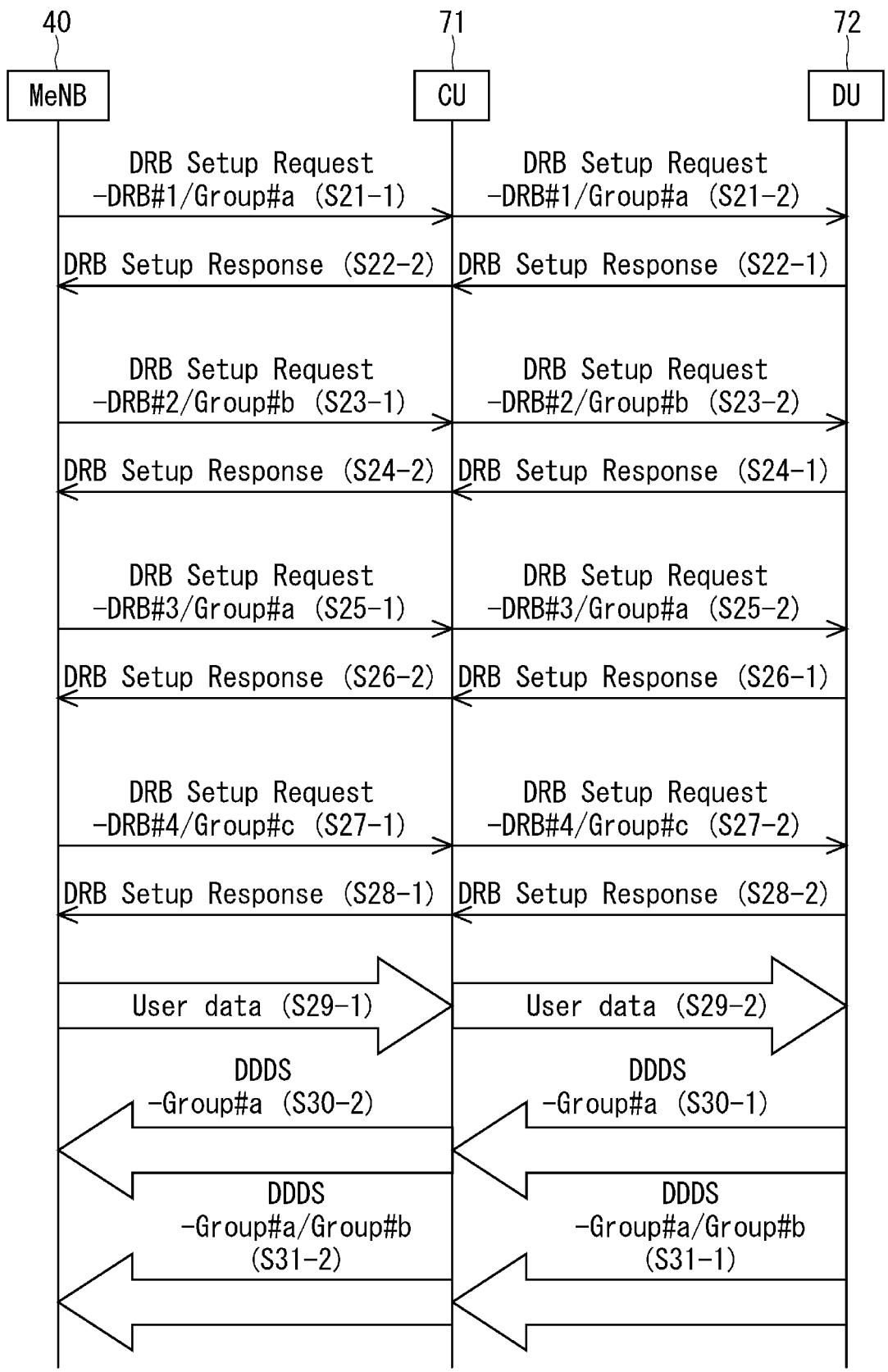
FIG. 11 is a sequence diagram for explaining an operation example of the radio communication system according to the third example embodiment.

Next, a configuration example of the radio communication system 200 according to the third example embodiment is described with reference to FIG. 11. FIG. 11 is a sequence diagram for explaining an operation example of the radio communication system according to the third example embodiment. FIG. 11 corresponds to the operation example shown in FIG. 7, where the MeNB 40 shown in FIG. 11 corresponds to the MeNB 40 shown in FIG. 7, and the DU 72 shown in FIG. 11 corresponds to the SeNB 50 shown in FIG. 7. Further, in FIG. 11, the CU 71 relays the exchange of messages between the MeNB 40 and the DU 72.

FIG. 11 is a diagram of a sequence from when the MeNB 40 establishes a DRB with the UE 30 through the CU 71 and the DU 72 to when the DU 72 transmits a DDDS message through the CU 71, and shows that the MeNB 40 establishes four DRBs. Note that as a premise of FIG. 11, a description is given in accordance with the assumption that a plurality of UEs 30 are included. That is, the four DRBs established by the MeNB 40 may be the DRBs of one UE 30 or the DRBs of a plurality of UEs 30 the number of which is from two to four. Further, a description is given in accordance with the assumption that although not shown in FIG. 11, the MeNB 40 receives a bearer setup request message from the MME 61 when the respective DRBs are established.

First, the MeNB 40 transmits a DRB Setup Request message for establishing a DRB #1 to the CU 71 (Step S21-1), and the CU 71 transmits the received DRB Setup Request message to the DU 72 (Step S21-2). It is assumed that MeNB 40 determines to classify the DRB #1 into a Group #a based on the priority of the bearer included in the bearer setting request message received from the MME 61. Then, the MeNB 40 transmits the DRB Setup Request message, including the number (the DRB #1) of the DRB to be established and the number of the group (the Group #a) into which the DRB is classified, to the CU 71. The CU 71 transmits the DRB Setup Request message received from the MeNB 40 to the DU 72.

Next, the DU 72 establishes the DRB #1 based on the DRB Setup Request message, and when the DRB #1 is established, the DU 72 transmits a DRB Setup Response message to the CU 71 (Step S22-1). Then, the CU 71 transmits the received DRB Setup Response message to the MeNB 40 (Step S22-2).

From Step S23 to Step S28, the MeNB 40, the CU 71, and the DU 72 perform the same operations as those performed in Steps 21-1, 21-2, 22-1, and 22-2. It is assumed here that the MeNB 40 classifies a DRB #2 into a Group #b, a DRB #3 into the Group #a, and a DRB #4 into a Group #c. The MeNB 40 transmits a DRB Setup Request message, including the number of the DRB to be established and the number of the group into which this DRB is classified, to the DU 72 through the CU 71. Then, when the respective DRBs are established, the DU 72 transmits a DRB Setup Response message to the MeNB 40 through the CU 71.

Next, when the MeNB 40 receives user data which is DL data from the S-GW 62, it transmits part of the user data to the DU 72 through the CU 71 (Steps S29-1 and S29-2). Although not shown in FIG. 11 the DU 72 transmits the user data received from the MeNB 40 to the UE 30.

Next, the DU 72 transmits a DDDS message to the MeNB 40 through the CU 71 (Steps S30-1 and S30-2). It is assumed that the DU 72 determines that it is necessary to control the DRB classified into the Group #a based on at least one of a state of the DU 72 and a radio state between the DU 72 and the UE 30. Then, the DU 72 includes the Group #a in the DDDS message and transmits it to the CU 71, and the CU 71 transmits the DDDS message received from the DU 72 to the MeNB 40.

Specifically, the DU 72 sets the Group Control Ind of the DDDS message to 1 (with control) and sets the Number of Groups reported of the DDDS message to 1. Further, the DU 72 sets the Group #a in the Group of the DDDS message and sets the control content for the Group #a in the Control Information of the DDDS message. Then, the DU 72 transmits the DDDS message to the MeNB 40 through the CU 71.

Next, the DU 72 transmits a DDDS message to the MeNB 40 through the CU 71 (Steps S31-1 and S31-2). It is assumed that the DU 72 determines that it is necessary to control the DRBs classified into the Groups #a and #b based on at least one of the state of the DU 72 and the radio state between the DU 72 and the UE 30. Then, the DU 72 includes the Groups #a and #b in the DDDS message and transmits it to the CU 71. The CU 71 transmits the DDDS message received from the DU 72 to the MeNB 40.

Specifically, the DU 72 sets the Group Control Ind of the DDDS message to 1 (with control) and sets the Number of Groups reported of the DDDS message to 2. Further, the DU 72 sets the Groups #a and #b in the Group of the DDDS message and sets the control contents for the Groups #a and #b in the Control Information of the DDDS message. Then, the DU 72 transmits the DDDS message to the MeNB 40 through the CU 71.

As described above, in this example embodiment, the SeNB 50 according to the second example embodiment is replaced with the CU 71 and the DU 72. In this example embodiment, the CU 71 has a function of relaying communication between the MeNB 40 and the DU 72, and in this example embodiment, the SeNB 50 according to the second example embodiment is replaced with the DU 72. Therefore, in this example embodiment, it is possible to obtain effects similar to those in the second example embodiment. That is, in this example embodiment, it is possible to perform efficient control in Dual Connectivity. Further, in this example embodiment, it is possible to reduce the processing loads on the radio stations (the MeNB 40 and the DU 72). Further, in this example embodiment, it is possible to reduce the consumption of a band of the transmission path.

Fourth Example Embodiment

Next, a fourth example embodiment is described. The fourth example embodiment differs from the third example embodiment in the split bearer configuration of the radio communication system 200. In the third example embodiment, the Split bearer configuration of the radio communication system 200 has been described as an MCG Split bearer configuration. In the fourth example embodiment, the Split bearer configuration of a radio communication system is an SCG Split bearer configuration.

<Configuration Example of Radio Communication System>

First, the radio communication system according to the fourth example embodiment is described. As described above, the fourth example embodiment differs from the third example embodiment only in the Split bearer configuration of the radio communication system, and the basic configuration thereof is similar to that of the third example embodiment, so that a description is given with reference to FIG. 8. Like in the case of the third example embodiment, the radio communication system 200 according to the fourth example embodiment includes the UE 30, the MeNB 40, the MME 61, the S-GW 62, the CU 71, and the DU 72. In the following description, a configuration example of the radio communication system 200 will be given, but redundant descriptions will be omitted as appropriate and only matters different from those described in the third example embodiment will be given.

As described above, the Split bearer configuration of the radio communication system 200 according to the fourth example embodiment is the SCG Split bearer configuration.

A configuration example of the UE 30 is similar to that of the third example embodiment, and thus descriptions thereof will be omitted.

The CU 71 corresponds to the radio station 10 according to the first example embodiment and corresponds to the MeNB 40 according to the third example embodiment. The CU 71 receives a bearer setup request message from the MME 61 and establishes a DRB with the UE 30. When the CU 71 establishes the DRB with the UE 30, the CU 71 establishes the DRB with the UE 71 through the DU 72 and establishes, as the SCG Split bearer, the DRB with the UE 30 through the MeNB 40.

When the CU 71 establishes the DRB with the UE 30 through the MeNB 40 and the DU 72, the CU 71 classifies this DRB into any one of a plurality of groups based on a predetermined classification condition. The CU 71 classifies the DRB to be established by a DRB Setup Request message into any one of the plurality of groups based on the priority of the bearer included in the bearer setup request message received from the MME 61. Then, the CU 71 transmits the DRB Setup Request message, which is an establishment request message requesting establishment of the DRB, and the group into which the DRB to be established is classified, to the MeNB 40 and the DU 72.

When user data is transmitted from the S-GW 62, the CU 71 transmits the user data to the UE 30 through the MeNB 40 and transmits the user data to the UE 30 through the DU 72.

Further, the CU 71 receives a DDDS message, which is a message notifying about a DL data communication status, from each of the MeNB 40 and the DU 72. That is, the CU 71 receives the DDDS message, which is the message notifying about the DL data communication status in the MeNB 40, from the MeNB 40 and receives the DDDS message, which is the message notifying about the DL data communication status in the DU 72, from the DU 72. Each of the MeNB 40 and the DU 72 may transmit the DDDS message per user (per DRB) or per group. When one of the aforementioned plurality of groups is included in the DDDS message, the CU 71 controls the DRB classified into the group included in the DDDS message.

The MeNB 40 corresponds to the radio station 20 according to the first example embodiment, and corresponds to the DU 72 according to the third example embodiment. When the MeNB 40 receives the DRB Setup Request message from the CU 71, the MeNB 40 establishes the DRB between the CU 71 and the UE 30 through the MeNB 40. When the MeNB 40 establishes the DRB, it transmits a DRB Setup Response message to the CU 71. The MeNB 40 monitors at least one of a state of the MeNB 40 and a radio state between the MeNB 40 and the UE 30. As the state of the MeNB 40, the MeNB 40 may monitor, for example, the processing load on the MeNB 40 or the remaining amount of a buffer of the MeNB 40. The MeNB 40 monitors at least one of the state of the MeNB 40 and the radio state between the MeNB 40 and the UE 30, and if the MeNB 40 determines that it is necessary to perform control because, for example, the processing load is high, it determines a group to be controlled and the control content. The MeNB 40 includes the group to be controlled and the control content in a DDDS message and transmits it to the CU 71. Note that a specific format of the DDDS message is similar to the format shown in FIG. 4, and thus descriptions thereof will be omitted.

The DU 72 corresponds to the radio station 20 according to the first example embodiment, and corresponds to the DU 72 according to the third example embodiment. When the DU 72 receives the DRB Setup Request message from the CU 71, the DU 72 establishes the DRB between the CU 71 and the UE 30 through the DU 72. When the DU 72 establishes the DRB, it transmits a DRB Setup Response message to the CU 71.

The DU 72 monitors at least one of a state of the DU 72 and a radio state between the DU 72 and the UE 30. As the state of the DU 72, the DU 72 may monitor, for example, the processing load on the DU 72 or the remaining amount of a buffer of the DU 72. The DU 72 monitors at least one of the state of the DU 72 and the radio state between the DU 72 and the UE 30, and if the DU 72 determines that it is necessary to perform control because, for example, the processing load is high, the DU 72 determines a group to be controlled and the control content. The DU 72 includes the group to be controlled and the control content in a DDDS message and transmits it to the CU 71. Note that a specific format of the DDDS message is similar to the format shown in FIG. 4, and thus descriptions thereof will be omitted.

The configurations of the MME 61 and the S-GW 62 are similar to those of the second example embodiment, and thus descriptions thereof will be omitted.

<Configuration Example of CU>

Next, a configuration example of the CU 71 is described. A basic configuration of the CU 71 according to the fourth example embodiment is similar to that of the MeNB 40 according to the third example embodiment, and thus a description is given with reference to FIG. 5. Note that as described above, the CU 71 is a control unit in the C-RAN configuration, and splits the baseband processing functions into the DU. Therefore, the CU 71 does not include the radio communication unit 44 and the ANT in the configuration shown in FIG. 5. That is, the CU 71 includes the communication unit 41, the classification unit 42, and the control unit 43.

The communication unit 41 communicates with other network nodes including the MeNB 40, the DU 72, the MME 61, and the S-GW 62. The communication unit 41 transmits a DRB Setup Request message to each of the MeNB 40 and the DU 72. The communication unit 41 transmits the DRB Setup Request message, including the group into which the DRB to be established by the DRB Setup Request message is classified, to each of the MeNB 40 and the DU 72. Note that the aforementioned group is the group into which the DRB is classified by the classification unit 42.

The communication unit 41 receives the DRB Setup Response message from each of the MeNB 40 and the DU 72.

The communication unit 41 transmits part of user data which is DL data received from the S-GW 62 to the UE 30 through the MeNB 40 and transmits another part of the user data to the UE 30 through the DU 72.

The communication unit 41 receives a DDDS message from each of the MeNB 40 and the DU 72. The DDDS message received by the communication unit 41 is a DDDS message in conformity with the DDDS message format in which new information pieces are added to the DDDS message format defined in the 3GPP described in FIG. 4.

The classification unit 42 and the control unit 43 are similar to those according to the third example embodiment, and thus descriptions thereof will be omitted.

<Configuration Example of MeNB>

Next, a configuration example of the MeNB 40 is described. A basic configuration of the MeNB 40 according to the fourth example embodiment is similar to that of the SeNB 50 according to the second example embodiment, and thus a description is given with reference to FIG. 6. Note that descriptions of configurations of the MeNB 40 similar to those of the SeNB 50 according to the second example embodiment will be omitted as appropriate. The MeNB 40 includes the communication unit 51, the storage unit 52, the state monitoring unit 53, the radio communication unit 54, and the ANT. Note that the MeNB 40 may include two or more antennas.

The communication unit 51 communicates with other network nodes including the CU 71, the MME 61, the S-GW 62, and the CU 71.

The communication unit 51 receives a DRB Setup Request message from the CU 71. The DRB Setup Request message includes the group into which the DRB to be established by this message is classified. The communication unit 51 associates the DRB number included in the DRB Setup Request message with the number of the group into which the DRB is classified, and stores them in the storage unit 52. When the communication unit 51 establishes the DRB, it transmits a DRB Setup Response message to the CU 71.

The communication unit 51 receives user data transmitted from the CU 71 and transmits the user data to the UE 30 through the radio communication unit 54.

The communication unit 51 transmits a DDDS message to the CU 71. The DDDS message transmitted by the communication unit 51 is the DDDS message shown in FIG. 4.

The storage unit 52, the state monitoring unit 53, and the radio communication unit 54 are similar to those of the SeNB 50 according to the second example embodiment, and thus descriptions thereof will be omitted.

<Configuration Example of DU>

Next, a configuration example of the DU 72 is described. The configuration example of the DU 72 according to the fourth example embodiment is similar to that of the MeNB 40 according to this example embodiment. That is, a basic configuration of the DU 72 according to the fourth example embodiment is similar to that of the SeNB 50 according to the second example embodiment, and thus a description is given with reference to FIG. 6. Note that descriptions of the configuration example of the DU 72 similar to that of the SeNB 50 according to the second example embodiment will be omitted as appropriate. The DU 72 includes the communication unit 51, the storage unit 52, the state monitoring unit 53, the radio communication unit 54, and the ANT. Note that the DU 72 may include two or more antennas.

The communication unit 51 communicates with other network nodes including the CU 71, the MME 61, the S-GW 62, and the CU 71.

The communication unit 51 receives a DRB Setup Request message from the CU 71. The DRB Setup Request message includes the group into which the DRB to be established by this message is classified. The communication unit 51 associates the DRB number included in the DRB Setup Request message with the number of the group into which the DRB is classified, and stores them in the storage unit 52. When the communication unit 51 establishes the DRB, it transmits a DRB Setup Response message to the CU 71.

The communication unit 51 receives user data transmitted from the CU 71 and transmits the user data to the UE 30 through the radio communication unit 54.

The communication unit 51 transmits a DDDS message to the CU 71. The DDDS message transmitted by the communication unit 51 is the DDDS message shown in FIG. 4.

The storage unit 52, the state monitoring unit 53, and the radio communication unit 54 are similar to those of the SeNB 50 according to the second example embodiment, and thus descriptions thereof will be omitted.

<Operation Example of Radio Communication System>

Next, a configuration example of the radio communication system 200 according to the fourth example embodiment is described. The operation example of the radio communication system 200 according to the fourth example embodiment is similar to the operation example shown in FIG. 7. However, in this example embodiment, the operation example shown in FIG. 7 is performed not only between the CU 71 and the MeNB 40 but also between the CU 71 and the DU 72.

Specifically, in this example embodiment, in the operation example performed between the CU 71 and the MeNB 40, the CU 71 performs an operation similar to that of the MeNB 40 shown in FIG. 7, and the MeNB 40 performs an operation similar to that of the SeNB 50 shown in FIG. 7. Further, similarly, in this example embodiment, in the operation example performed between the CU 71 and the DU 72, the CU 71 performs an operation similar to that of the MeNB 40 shown in FIG. 7, and the DU 72 performs an operation similar to that of the SeNB 50 shown in FIG. 7.

As described above, even when the Split bearer configuration is the SCG Split bearer configuration as in the case of this example embodiment, it is possible to obtain effects similar to those in the third example embodiment. That is, in this example embodiment, it is possible to perform efficient control in Dual Connectivity. Further, in this example embodiment, it is possible to reduce the processing loads on the base stations (the MeNB 40 and the DU 72). Further, in this example embodiment, it is possible to reduce the consumption of a band of the transmission path.

Other Example Embodiments

<1> In the third and the fourth example embodiments described above, the SeNB 50 according to the second example embodiment comprises the CU 71 and the DU 72, but instead only the MeNB 40 according to the second example embodiment may comprise the CU and the DU. Alternatively, both the MeNB 40 and the SeNB 50 according to the second example embodiment may comprise the CU and the DU.

In the second example embodiment, when only the MeNB 40 comprises the CU and the DU and the Split bearer configuration is the MCG Split bearer configuration, the CU with which the MeNB 40 is replaced corresponds to the radio station 10 according to the first example embodiment. Further, the CU with which the MeNB 40 is replaced corresponds to the MeNB 40 according to the second example embodiment. Further, the DU and the SeNB 50 with which the MeNB 40 is replaced correspond to the radio station 20 according to the first example embodiment and correspond to the SeNB 50 according to the second example embodiment.

In the second example embodiment, when only the MeNB 40 comprises the CU and the DU and the Split bearer configuration is the SCG Split bearer configuration, the SeNB 50 corresponds to the radio station 10 according to the first example embodiment. Further, the SeNB 50 corresponds to the MeNB 40 according to the second example embodiment. Further, the DU with which the MeNB 40 is replaced corresponds to the radio station 20 according to the first example embodiment and corresponds to the SeNB 50 according to the second example embodiment. Like in the case of the CU 71 according to the third example embodiment, the CU with which the MeNB 40 is replaced relays communication between the SeNB 50 and the DU with which the MeNB 40 according to the second example embodiment is replaced.

Further, the following description is given of a case in which both the MeNB 40 and the SeNB 50 comprise the CU and the DU in the second example embodiment. When the Split bearer configuration is the MCG Split bearer configuration, the CU with which the MeNB 40 is replaced corresponds to the radio station 10 according to the first example embodiment and corresponds to the MeNB 40 according to the second example embodiment. Further, each of the DU with which the MeNB 40 is replaced and the DU with which the SeNB 50 is replaced corresponds to the radio station 20 according to the first example embodiment and corresponds to the SeNB 50 according to the second example embodiment. Like in the case of the CU 71 according to the third example embodiment, the CU with which the SeNB 50 is replaced relays communication between the CU with which the MeNB 40 is replaced and the DU with which the SeNB 50 is replaced.

Further, when the Split bearer configuration is the SCG Split bearer configuration, the CU with which the SeNB 50 is replaced corresponds to the radio station 10 according to the first example embodiment and corresponds to the MeNB 40 according to the second example embodiment. Further, each of the DU with which the MeNB 40 is replaced and the DU with which the SeNB 50 is replaced corresponds to the radio station 20 according to the first example embodiment and corresponds to the SeNB 50 according to the second example embodiment. Like in the case of the CU 71 according to the third example embodiment, the CU with which the MeNB 40 is replaced relays communication between the CU with which the SeNB 50 is replaced and the DU with which the MeNB 40 is replaced.

<2> The radio station 10, the radio station 20, the MeNB 40, the SeNB 50, the CU 71, and the DU 72 (hereinafter collectively referred to as the radio station 10 and the like) according to the above-described example embodiments may each have the following hardware configuration.

Figure 12:
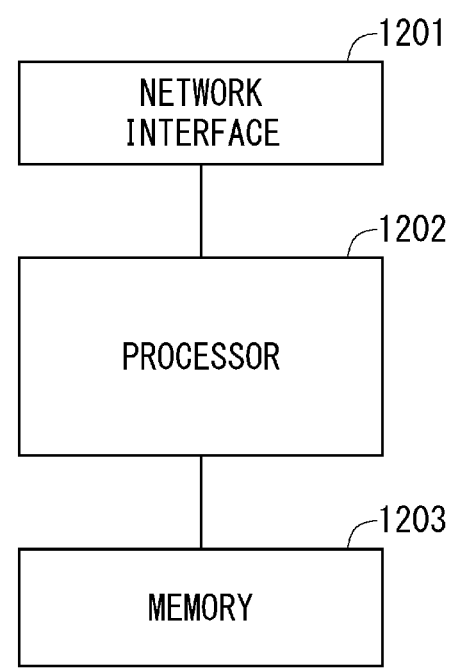
FIG. 12 is a schematic configuration diagram showing a configuration example of each of a radio station and the like according to other example embodiments.

Referring to FIG. 12, the radio station 10 and the like each include a network interface 1201, a processor 1202, and a memory 1203. The network interface 1201 is used to communicate with other radio communication apparatuses. The network interface 1201 may include, for example, a network interface card (NIC) in conformity with IEEE 802.11 series and IEEE 802.3 series.

The processor 1202 loads software (computer programs) from the memory 1203 and executes the loaded software, thereby performing the processing of the radio station 10 and the like described with reference to the flowchart in the above-described example embodiments. The processor 1202 may be, for example, a microprocessor, a Micro Processing Unit (MPU), or a Central Processing Unit (CPU). The processor 1202 may include a plurality of processors.

The memory 1203 is composed of a combination of a volatile memory and a non-volatile memory. The memory 1203 may include a storage located apart from the processor 1202. In this case, the processor 1202 may access the memory 1203 through an I/O interface (not shown).

In the example shown in FIG. 12, the memory 1203 is used to store software modules. The processor 1202 can load these software modules from the memory 1203 and execute the loaded software modules, thereby performing the processing of the radio station 10 and the like described in the above-described example embodiments.

As described with reference to FIG. 12, each of the processors included in the radio station 10 and the like executes one or a plurality of programs including instructions to cause a computer to perform an algorithm described with reference to the drawings.

In the above-described examples, the program(s) can be stored and provided to a computer using any type of non-transitory computer readable media. Non-transitory computer readable media include any type of tangible storage media. Examples of non-transitory computer readable media include magnetic storage media (e.g., flexible disks, magnetic tapes, and hard disk drives), optical magnetic storage media (e.g., magneto-optical disks). Further, examples of non-transitory computer readable media include CD-ROM (Read Only Memory), CD-R, and CD-R/W. Further, examples of non-transitory computer readable media include semiconductor memories. The semiconductor memories include, for example, mask ROM, PROM (Programmable ROM), EPROM (Erasable PROM), flash ROM, RAM (Random Access Memory), etc. Further, the program(s) may be provided to a computer using any type of transitory computer readable media. Examples of transitory computer readable media include electric signals, optical signals, and electromagnetic waves. Transitory computer readable media can provide the program(s) to a computer via a wired communication line (e.g., electric wires, and optical fibers) or a wireless communication line.

While the present disclosure has been described with reference to the example embodiments, the present disclosure is not limited to the above-described example embodiments. Various modifications that can be understood by those skilled in the art can be made to the configurations and the details of the present disclosure within the scope of the present disclosure. Further, the present disclosure may be executed by combining the example embodiments as appropriate.

Further, the whole or part of the example embodiments disclosed above can be described as, but not limited to, the following supplementary notes.

(Supplementary Note 1)

A radio station comprising:

a classification unit configured to classify, when a data radio bearer is established with a communication terminal through another radio station, the data radio bearer into one of a plurality of groups based on a predetermined classification condition; and a transmission unit configured to transmit, to the other radio station, an establishment request message requesting establishment of the data radio bearer, and the group into which the data radio bearer is classified.

(Supplementary Note 2)

The radio station described in Supplementary note 1, further comprising:

a reception unit configured to receive, from the other radio station, a data communication status notification message notifying about a status of downlink data communication in the other radio station; and a control unit configured to control, when one of the plurality of the groups is included in the data communication status notification message, the data radio bearer classified into the group included in the data communication status notification message.

(Supplementary Note 3)

The radio station described in Supplementary note 2, wherein the control unit performs control based on a control content included in the data communication status notification message.

(Supplementary Note 4)

The radio station described in Supplementary note 2 or 3, wherein the data communication status notification message includes first information indicating whether control is performed per group into which respective radio bearers are classified, and further includes, when the first information indicates that control is performed per group, second information about a group to be controlled and third information indicating a control content for the data radio bearer classified into the group to be controlled, and the control unit determines, based on the first information, whether one of the plurality of groups is included in the data communication status notification message, and performs the control content indicated by the third information with regard to the data radio bearer classified into the group included in the second information.

(Supplementary Note 5)

The radio station described in Supplementary note 4, wherein when the first information indicates that control is performed per group, the data communication status notification message further includes fourth information indicating a number of groups to be controlled.

(Supplementary Note 6)

The radio station described in any one of Supplementary notes 2 to 5, wherein the control unit performs at least one of: control for stopping processing of the data radio bearer classified into the group included in the data communication status notification message; control for changing a communication speed of the data radio bearer; and control for changing a ratio of an amount of data to be transmitted to the communication terminal through the other radio station to an amount of data to be transmitted to the communication terminal without through the other radio station among an amount of data to be allocated to the data radio bearer.

(Supplementary Note 7)

A radio station comprising reception unit for receiving, when a data radio bearer is established between a communication terminal and another radio station through the radio station, an establishment request message requesting establishment of the data radio bearer, and any one of a plurality of groups into which the other radio station has classified the data radio bearer based on a predetermined classification condition, from the other radio station.

(Supplementary Note 8)

The radio station described in Supplementary note 7, further comprising:

a state monitoring unit configured to determine whether any one of the plurality of the groups is to be controlled based on at least one of a state of the radio station and a radio state between the radio station and the communication terminal; and a transmission unit configured to transmit, when the state monitoring unit determines that any one of the plurality of groups is to be controlled, a data communication status notification message that includes the group to be controlled and that notifies about a status of downlink data communication in the radio station, to the other radio station.

(Supplementary Note 9)

The radio station described in Supplementary note 8, wherein the state of the radio station includes at least one of a processing load on the radio station and a remaining amount of a buffer of the radio station.

(Supplementary Note 10)

The radio station described in any one of Supplementary notes 2 to 6, 8, and 9, wherein the data communication status notification message is a DL DATA DELIVERY STATUS (DDDS) message.

(Supplementary Note 11)

The radio station described in any one of Supplementary notes 1 to 10, wherein the data radio bearer is a Data Radio Bearer (DRB), and the establishment request message includes at least one of a DRB Setup Request message, a SENB ADDITION REQUEST message and a SENB MODIFICATION REQUEST message.

(Supplementary Note 12)

The radio station described in any one of Supplementary notes 1 to 11, wherein the predetermined classification condition includes a condition corresponding to a priority of the data radio bearer.

(Supplementary Note 13)

The radio station described in Supplementary note 12, wherein the priority corresponds to a priority of a bearer included in a bearer setup request message from a core network apparatus.

(Supplementary Note 14)

A radio communication method comprising:

classifying, when a data radio bearer is established with a communication terminal through another radio station, the data radio bearer into one of a plurality of groups based on a predetermined classification condition; and transmitting, to the other radio station, an establishment request message requesting establishment of the data radio bearer, and the group into which the data radio bearer is classified.

(Supplementary Note 15)

A radio communication method performed in a radio station, the radio communication method comprising receiving, when a data radio bearer is established between a communication terminal and another radio station through the radio station, an establishment request message requesting establishment of the data radio bearer, and a group into which the data radio bearer is classified, from the other radio station.

(Supplementary Note 16)

A non-transitory computer readable medium storing a radio communication program for causing a computer to:

classify, when a data radio bearer is established with a communication terminal through another radio station, the data radio bearer into one of a plurality of groups based on a predetermined classification condition; and transmit, to the other radio station, an establishment request message requesting establishment of the data radio bearer, and the group into which the data radio bearer is classified.

(Supplementary Note 17)

A non-transitory computer readable medium storing a radio communication program for causing a computer to receive, when a data radio bearer is established between a communication terminal and another radio station through a radio station, an establishment request message requesting establishment of the data radio bearer, and a group into which the data radio bearer is classified, from the other radio station.

(Supplementary Note 18)

A radio communication system comprising a first radio station, a second radio station, and a communication terminal, wherein when a data radio bearer is established with the communication terminal through the second radio station, the first radio station classifies the data radio bearer into one of a plurality of groups based on a predetermined classification condition, and transmits, to the second radio station, an establishment request message requesting establishment of the data radio bearer, and the group into which the data radio bearer is classified, and the second radio station receives the establishment request message and the group from the first radio station.

This application is based upon and claims the benefit of priority from Japanese patent application No. 2018-145151, filed on Aug. 1, 2018, the disclosure of which is incorporated herein in its entirety by reference.

REFERENCE SIGNS LIST

1 RADIO COMMUNICATION SYSTEM
10, 20 RADIO STATION
11, 42 CLASSIFICATION UNIT
12 TRANSMISSION UNIT
21 RECEPTION UNIT
30 UE
40 MeNB
41, 51 COMMUNICATION UNIT
43 CONTROL UNIT
44, 54 RADIO COMMUNICATION UNIT
50 SeNB
52 STORAGE UNIT
53 STATE MONITORING UNIT
60 CORE NETWORK
61 MME
62 S-GW
71 CU
72 DU
73, 400, 500 COMMUNICATION AREA
711 COMMUNICATION UNIT

The invention claimed is:

1. A radio station comprising:
at least one memory storing instructions; and
at least one processor configured to execute the instructions to:
classify, when a data radio bearer is established with a communication terminal through another radio station, the data radio bearer into one of a plurality of groups based on a predetermined classification condition;
transmit, to the other radio station, an establishment request message requesting establishment of the data radio bearer, and the group into which the data radio bearer is classified;
receive, from the other radio station, a data communication status notification message notifying about a status of downlink data communication in the other radio station; and
control, when one of the plurality of the groups is included in the data communication status notification message, the data radio bearer classified into the group included in the data communication status notification message,
wherein the data communication status notification message includes first information indicating whether control is performed per group into which respective radio bearers are classified, and further includes, when the first information indicates that control is performed per group, second information about a group to be controlled and third information indicating a control content for the data radio bearer classified into the group to be controlled, and
wherein the at least one processor is further configured to execute the instructions to determine, based on the first information, whether one of the plurality of groups is included in the data communication status notification message, and perform the control content indicated by the third information with regard to the data radio bearer classified into the group included in the second information.

2. The radio station according to claim 1, wherein when the first information indicates that control is performed per group, the data communication status notification message further includes fourth information indicating a number of groups to be controlled.

3. The radio station according to claim 1,
wherein the at least one processor is further configured to execute the instructions to perform at least one of: control for stopping processing of the data radio bearer classified into the group included in the data communication status notification message; control for changing a communication speed of the data radio bearer; and control for changing a ratio of an amount of data to be transmitted to the communication terminal through the other radio station to an amount of data to be transmitted to the communication terminal without through the other radio station among an amount of data to be allocated to the data radio bearer.

4. The radio station according to claim 1, wherein the data communication status notification message is a DL DATA DELIVERY STATUS (DDDS) message.

5. The radio station according to claim 1, wherein the data radio bearer is a Data Radio Bearer (DRB), and the establishment request message includes at least one of a DRB Setup Request message, a SENB ADDITION REQUEST message and a SENB MODIFICATION REQUEST message.

6. The radio station according to claim 1, wherein the predetermined classification condition includes a condition corresponding to a priority of the data radio bearer.

7. The radio station according to claim 6, wherein the priority corresponds to a priority of a bearer included in a bearer setup request message from a core network apparatus.

8. A radio station comprising:
at least one memory storing instructions; and
at least one processor configured to execute the instructions to receive, when a data radio bearer is established between a communication terminal and another radio station through the radio station, an establishment request message requesting establishment of the data radio bearer, and one of a plurality of groups into which the other radio station has classified the data radio bearer based on a predetermined classification condition, from the other radio station;
determine a group to be controlled among the plurality of the groups based on at least one of a state of the radio station and a radio state between the radio station and the communication terminal; and
transmit a data communication status notification message that includes the group to be controlled and that notifies about a status of downlink data communication in the radio station, to the other radio station,
wherein the data communication status notification message includes first information indicating whether control is performed per group into which respective radio bearers are classified, and further includes, when the first information indicates that control is performed per group, second information about a group to be controlled and third information indicating a control content for the data radio bearer classified into the group to be controlled.

9. The radio station according to claim 8, wherein the state of the radio station includes at least one of a processing load on the radio station and a remaining amount of a buffer of the radio station.

10. A radio communication method comprising:
classifying, when a data radio bearer is established with a communication terminal through another radio station, the data radio bearer into one of a plurality of groups based on a predetermined classification condition; and
transmitting, to the other radio station, an establishment request message requesting establishment of the data radio bearer, and the group into which the data radio bearer is classified;
receiving, from the other radio station, a data communication status notification message notifying about a status of downlink data communication in the other radio station; and
controlling, when one of the plurality of the groups is included in the data communication status notification message, the data radio bearer classified into the group included in the data communication status notification message,
wherein the data communication status notification message includes first information indicating whether control is performed per group into which respective radio bearers are classified, and further includes, when the first information indicates that control is performed per group, second information about a group to be controlled and third information indicating a control content for the data radio bearer classified into the group to be controlled, and
determining, based on the first information, whether one of the plurality of groups is included in the data communication status notification message, and performing the control content indicated by the third information with regard to the data radio bearer classified into the group included in the second information.

* * * * *